US012578956B2

(12) United States Patent
Aggarwal et al.

(10) Patent No.: US 12,578,956 B2
(45) Date of Patent: Mar. 17, 2026

(54) METHOD AND APPARATUS FOR FIRMWARE PATCHING

(71) Applicant: Intel Corporation, Santa Clara, CA (US)

(72) Inventors: Nivedita Aggarwal, Portland, OR (US); Prashant Dewan, Portland, OR (US); Subrata Banik, Bangalore (IN); Ofir Shwartz, Haifa (IL); Baiju V. Patel, Portland, OR (US); Yazan Siam, Beaverton, OR (US); Kumar Dwarakanath, Folsom, CA (US); Vincent Zimmer, Issaquah, WA (US)

(73) Assignee: Intel Corporation, Santa Clara, CA (US)

( * ) Notice: Subject to any disclaimer, the term of this patent is extended or adjusted under 35 U.S.C. 154(b) by 636 days.

(21) Appl. No.: 17/454,564

(22) Filed: Nov. 11, 2021

(65) Prior Publication Data

US 2022/0137955 A1     May 5, 2022

(30) Foreign Application Priority Data

Jun. 15, 2021    (IN) ............................. 202141026547

(51) Int. Cl.
*G06F 11/3668* (2025.01)
*G06F 1/24* (2006.01)
*G06F 8/654* (2018.01)

(52) U.S. Cl.
CPC ................ *G06F 8/654* (2018.02); *G06F 1/24* (2013.01); *G06F 11/3688* (2013.01)

(58) Field of Classification Search
CPC .......... G06F 8/654; G06F 1/24; G06F 11/3688
See application file for complete search history.

(56) References Cited

U.S. PATENT DOCUMENTS

| | | | |
|---|---|---|---|
| 10,613,848 B2 * | 4/2020 | Meng ...................... G06F 9/445 |
| 2009/0241103 A1 * | 9/2009 | Pennisi ................... G06F 3/068 |
| | | | 713/323 |
| 2010/0313105 A1 * | 12/2010 | Nekoomaram ..... G06F 11/1433 |
| | | | 717/171 |
| 2021/0034355 A1 | 2/2021 | Montero et al. |
| 2021/0216638 A1 * | 7/2021 | Park ...................... G06F 21/572 |

FOREIGN PATENT DOCUMENTS

| | | | | |
|---|---|---|---|---|
| JP | 2009102003 A | * | 5/2009 | |
| WO | WO-2019017175 A1 | * | 1/2019 | ............. B60R 16/02 |

OTHER PUBLICATIONS

NPL_WO 2019017175 A1_Tetsuya (Year: 2019).*
NPL_JP2009102003A_Satoru (Year: 2009).*

* cited by examiner

*Primary Examiner* — Ziaul A Chowdhury
(74) *Attorney, Agent, or Firm* — 2SPL Patent Attorneys PartG mbB; Kieran O'Leary

(57) ABSTRACT

A method of handling a firmware update for a device is disclosed, comprising: determining a device to be in an updatable state; setting the device into an updating state after determining the updatable state; and after the device is in the updating state, writing a firmware update to memory for the device. After writing the firmware update, the device is switchable to a working state in which the device operates based on the firmware update.

24 Claims, 11 Drawing Sheets

METHOD AND APPARATUS FOR FIRMWARE PATCHING

CROSS-REFERENCE TO RELATED APPLICATIONS

This application claims priority to Indian patent application 202141026547, filed Jun. 15, 2021, entitled "Method and Apparatus for Firmware Patching," which is incorporated by reference in its entirety.

FIELD

Examples relate to methods of updating firmware and apparatuses that update firmware.

BACKGROUND

Modern computer systems may have several firmware components. Firmware updates or patches can be provided to computer systems for a variety of reasons. Firmware updates may provide more efficient operation of devices, fix bugs, and/or enhance operational capabilities. Security attacks on firmware components can be a problem, and may result in loss of revenue, loss of productivity, and/or leaks of information such as business data.

Firmware updates may improve the security of computers/computer systems. Mitigating firmware attacks can be done by sending firmware updates and/or patches in-field.

BRIEF DESCRIPTION OF THE FIGURES

Some examples of apparatuses and/or methods will be described in the following by way of example only, and with reference to the accompanying figures, in which.

DETAILED DESCRIPTION

Figures 1A, 1B, 2A, 2B, 3:
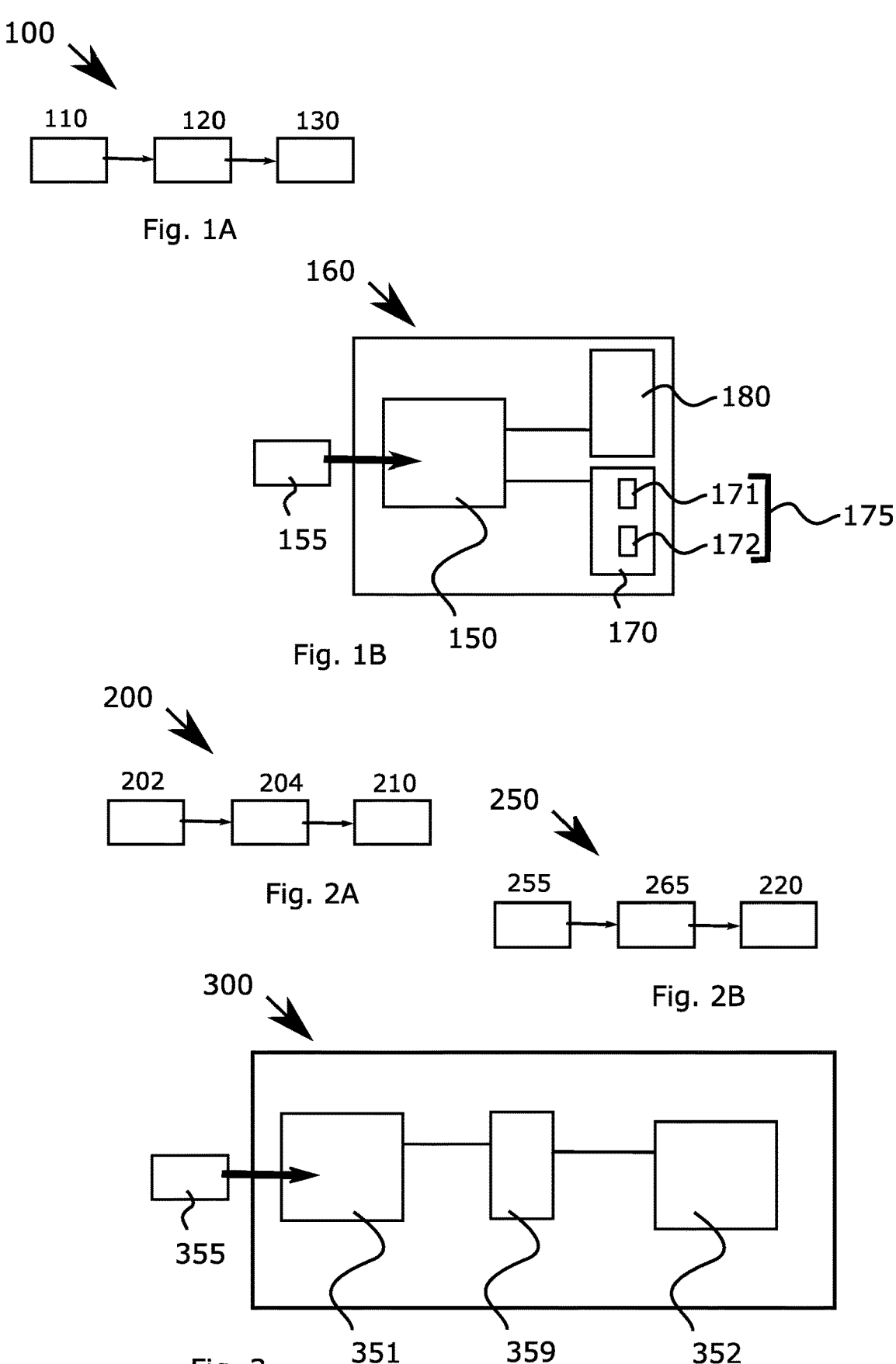
FIG. 1A illustrates a method of handling a firmware update for a device.
FIG. 1B illustrates a device with updatable firmware and an apparatus.
FIG. 2A illustrates a method of handling a firmware update for a device.
FIG. 2B illustrates a method of handling a firmware update for a device.
FIG. 3 illustrates a device with updatable firmware and an apparatus.

Some examples are now described in more detail with reference to the enclosed figures. However, other possible examples are not limited to the features of these examples described in detail. Other examples may include modifications of the features as well as equivalents and alternatives to the features. Furthermore, the terminology used herein to describe certain examples should not be restrictive of further possible examples.

Throughout the description of the figures same or similar reference numerals refer to same or similar elements and/or features, which may be identical or implemented in a modified form while providing the same or a similar function. The thickness of lines, layers and/or areas in the figures may also be exaggerated for clarification.

When two elements A and B are combined using an 'or', this is to be understood as disclosing all possible combinations, i.e. only A, only B as well as A and B, unless expressly defined otherwise in the individual case. As an alternative wording for the same combinations, "at least one of A and B" or "A and/or B" may be used. This applies equivalently to combinations of more than two elements.

If a singular form, such as "a", "an" and "the" is used and the use of only a single element is not defined as mandatory either explicitly or implicitly, further examples may also use several elements to implement the same function. If a function is described below as implemented using multiple elements, further examples may implement the same function using a single element or a single processing entity. It is further understood that the terms "include", "including", "comprise" and/or "comprising", when used, describe the presence of the specified features, integers, steps, operations, processes, elements, components and/or a group thereof, but do not exclude the presence or addition of one or more other features, integers, steps, operations, processes, elements, components and/or a group thereof.

Herein methods and apparatuses for firmware patching are disclosed. It is disclosed that apparatuses, such as electronic devices, can be configured to control and/or execute the methods disclosed herein. Herein are disclosed apparatuses which include circuitry which is configured to control the methods of updating firmware of a device.

Herein a trailing (s) indicates one or more. For example, "device(s)" or "a device(s)" refers to one or more devices.

Herein patch and update may be used interchangeably. The methods of updating and/or managing an update described herein may be managed by an apparatus that remains in a working state through the managing/updating process. The device with firmware for updating may be communicatively coupled to the apparatus or may be considered to be part of the apparatus. For example, the apparatus may update/manage the update of a device without rebooting the apparatus. The device may be reset without resetting the apparatus. The apparatus may be a system on a chip and/or include a computer processor. The apparatus may continually run an operating system throughout the managing/updating of the firmware for the device. The term "managing a firmware update" may be used interchangeably with "handling a firmware update" and may optionally include rejecting the update, e.g. if operation of the device using the firmware update causes errors.

Herein, update mode may be used interchangeably with updating state. For example, when a device is being updated and/or in a state in which the device is being updated, it is in an "updating state" or in "update mode."

FIG. 1A illustrates a method of handling a firmware update for a device. FIG. 1B shows a device 150 which can have updatable firmware.

The method 100 of handling the update can include storing 110 the firmware update in a reserved memory 175 (see also FIG. 1B). The device 150 can be tested 120 using the firmware update in the reserved memory 175. After the testing 120, the firmware update can be written 130 to nonvolatile memory 180 for the device 150.

FIG. 1B shows a device 150 which can have updatable firmware. The device 150 can be part of another device such as an apparatus 160 such as a system on a chip 160 (SoC). Alternatively/additionally, the apparatus 160 can be communicatively coupled to the device 150 and/or may manage the firmware update of the device. The device 150 can be communicatively coupled to volatile memory 170 and/or nonvolatile memory 180. The volatile memory 170 can include reserved memory 175, which can have multiple portions such as a first portion 171 and second portion 172. The portions 171, 172 may be regarded as primary and secondary firmware banks, respectively.

The reserved memory 175 can be a portion of volatile memory 170, such as DRAM and/or SRAM. The reserved memory 175 can be a component on a system on a chip 160 (SoC). By storing the firmware update 155 in a reserved memory 175, it can be possible to quickly test the update, such as before storing the update in the nonvolatile memory 180.

The device 150 can be communicatively coupled to a system on a chip 160 (SoC) and/or is a component of a SoC 160.

The nonvolatile memory 180 for the device can be located on the device 150 and/or elsewhere, such as on a circuit board and/or system on a chip 160 (SoC). The nonvolatile memory 180 can be flash memory, SPINOR memory (serial peripheral interface NOR flash memory), and/or NAND memory. Flash and/or SPINOR memory is particularly contemplated as being used as nonvolatile memory 180 to store firmware for the device 150 which can be many kinds of devices that have updatable firmwares, e.g. including updated and tested firmware as described herein.

The reserved memory 175 can be reserved such that writing to the reserved memory 175 is forbidden other than by the firmware update 155 and/or from the nonvolatile memory 180. The firmware update 155 may undergo a security verification process before being written/stored 110 to the reserved memory 175, including possibly a security verification by an external device. Alternatively/additionally, there can be a security verification before the firmware update 155 is written 130 to nonvolatile memory 180.

The firmware update 155 can include code for operating the device 150.

Testing 120 (see the method of FIG. 1A) can include using a portion of a previous firmware which can be copied to the reserved memory 175 from the nonvolatile memory 180. The firmware update 155 and at least a portion of the previous firmware for the device 150 can be stored in the reserved memory 175 simultaneously. The testing 120 can test operation of the device 150 based on the firmware update 155 in combination with the portion of the previous firmware (e.g. the portion of the previous firmware that is stored in/copied to the reserved memory 175 prior to the test). For example, the update can affect one or more (but possibly not all) operations of the device 150. The testing 120 can determine if the device's operation is as expected when the update is included in the code for operation of the device 150. If the device's operation is as expected (e.g. the test is passed), for example, the firmware update 155 can be written 130 to the nonvolatile memory 180, e.g. such that the update is stored along with the portion of the previous firmware that was used for the passed test.

For example, testing 120 can include comparing an actual service provided by the device 150 with an expected service of the device 150. If the comparison is favorable, then the test 120 can be regarded as being passed. For example, for certain inputs, an expected output exists; when the certain inputs are provided to the device 150, the actual output may match the expected output, which may be used as at least one component of a successful test result.

It is possible that the firmware update, such as the testing 120 of the firmware update, is delayed. For example, the update may be for a device 150 which is in use. The device 150 may be operating using the previous firmware while the firmware update is stored in a secondary firmware bank 172 before the testing. The secondary firmware bank 172 can be a portion of the reserved memory 175. Referring to FIG. 1A, storing 110 can include storing the firmware update in a secondary firmware bank 172 before testing 120. For example, if the device 150 is busy when the firmware update 155 is received (and/or determined to be available), it may be stored 110 in reserved memory 175, such as the secondary firmware bank 172, before testing 120, security verification of the firmware update 155, and/or operation of the device 150 using the update 155.

It may be convenient to have a secondary firmware bank 172 in the reserved memory 175 that can be for storing firmware updates 155, e.g. before implementation and/or testing of the update 155.

FIG. 2A illustrates a method of handling a firmware update for a device. The method 200 of updating the firmware may include initializing 202 the device 150 using the previous version of firmware. Other devices may also be initialized. The method 200 may also include determining 204 the state of the device. The state(s) of other device(s) may also be determined.

It is possible to determine 204 the state of the device 150 before optional testing 120 and/or writing 130 to nonvolatile memory 180. For example, when a busy state of the device is determined 204, the testing 120 and/or writing 130 to nonvolatile memory 180 can be delayed, e.g. which can include storing 210 the firmware update, e.g. in the volatile memory 170 (e.g. the reserved memory 175, particularly in the secondary firmware bank 172). The busy state can be the device 150 operating using the previous firmware. The device 150 can be operated using the previous firmware (which may be in the primary firmware bank 171 while the device 150 is operated using the previous firmware) while the firmware update is stored 210, e.g. in the secondary firmware bank 172.

The apparatus 160 may manage the firmware update, such as determining the device 150 to be in an updatable state, then causing the device 150 to be set to an updating state. The apparatus 160 can receive the firmware update and/or determine that the firmware update is available. The apparatus 160 can cause the firmware update code to be written in reserved memory, and cause testing 120 of the device which can include operation of the device based on the firmware update code (e.g. after the firmware update code is written in the reserved memory). The apparatus can cause writing of the firmware update code to nonvolatile memory, particularly when the test is passed. If the test if failed, the firmware update can be rejected or postponed. The operational state of the apparatus 160 can be uninterrupted during the management of the firmware update of the device 150 (e.g the apparatus can remain in an operational state while the firmware update is stored, written into memory, tested, etc).

The updatable state of the device 150 can be a D1, D2, or D3 state, for example. Alternatively/additionally the updatable state can include at least one of: an idle state, a low power state, a power conserving state, a paused state, a condition of the device after a notice that the device is ready to change states, or an off state. The state designations which are updatable may not be mutually exclusive. A power manager and/or advanced configuration and power interface may determine the state of the device and/or control the state of the device 150.

FIG. 2B illustrates a method 250 of handling a firmware update for a device. The device may not be in an updatable state, e.g. when the device 150 is busy, working, and/or providing a service. It is possible to determine 255 an end of the busy state, e.g. before testing 220 the device. After the end of the busy state is determined 255, and before optional testing 220, the firmware update 155 can be relocated 265 from the secondary firmware bank 172 to the primary firmware bank 171 of the reserved memory 175, e.g. where the firmware for operation of the device 150 is at least partially stored during the operation of the device 150.

The reserved memory 175, including the primary bank 171 which can be used for storing the firmware update 155 (during testing 120 and/or operation of the device 150), and/or the secondary firmware bank 172, may be protected from being written to by a security controller and/or other device or process.

The apparatus 160 can determine the device 150 to be in a working state, for example. The apparatus 160 can cause the firmware update code to be stored in the secondary firmware bank 172 of the reserved memory 175 after determining the device 150 to be in the working state, and until the determination (e.g. a subsequent determination) that the device 150 is in an updatable state. The apparatus 150 can cause relocating of the firmware update code out of the secondary firmware bank 172 to the primary firmware bank 171 of the reserved memory 175 before causing the test 120, e.g. after the device 150 is determined to be in an updatable state and/or put into the updating state (which may include the determination of the test result 120).

It is possible that when the firmware update is determined available and/or received, the device 150 is busy. For example, the apparatus 150 can cause the storing of the context of the device (e.g. when the update becomes available), and cause the device to halt service. The apparatus 160 can cause the device 150 to reset (e.g. after storing the context). After the reset, the device 150 can load the firmware update (e.g. from reserved memory 175). Alternatively/additionally, the device 150 can restore the context and/or resume the service (e.g. the previously halted service).

It is also contemplated that more than one device can be affected by the firmware update 155. For example, more than one device may be tested 120 using the firmware update.

FIG. 3 illustrates an apparatus 300 which can have updatable firmware. Some devices may have their operation(s) directly affected by the firmware update. The device apparatus of FIG. 3 is shown to have two devices, a primary device 351 and a secondary device 352. Devices that have their operation directly impacted by a firmware update 355 may also have, at least potentially, their interaction with other devices impacted. A primary device 351 that is updated may have the interaction between the primary device 351 and a secondary device 352 which may be communicatively coupled to the primary device 351 impacted. Alternatively/additionally, a firmware update 355 applied and/or available to a first device 351 may impact the operation of a second device 352 (e.g. when installed and/or during testing).

Secondary devices, such as secondary device 352 shown in FIG. 3, may be at least potentially impacted by a firmware update to a primary device 351 which may have its operation directly altered by the firmware update 355. A secondary device 352 may be one that transmits and/or receives data 359 and/or input/output with the primary device 351. For example, the firmware update 355 is for a first device 351 and may change the operation of the first device. Referring to FIG. 1A, the optional testing 120 can include testing the first device 351 and a second device 352, such as before writing 130 the firmware update 355 to nonvolatile memory 180 for the first device 351 (e.g. using the firmware update code in reserved memory 175). The testing 120 can include testing a plurality of devices which include the first and second devices 351, 352.

In an example, the apparatus 300 can cause a second test of a second device 352 which is communicatively coupled to a first device 351 (e.g. in addition to a first test such as a test of the first or primary device 351). The apparatus 300 can determine a result of the second test and/or the first test. If the second test (e.g. each of the first and second tests) is passed, the apparatus 300 can cause the writing 130 of the firmware update code to the nonvolatile memory. If the second test is failed, the apparatus can cause the firmware update to be rejected and/or postponed.

For example, the second test includes comparing an expected service and an actual service of the second device when determining the result of the second test.

In another example, an update request can be transmitted to the device 150, which may include a state matching query. Such an update request can be done before the device 150 is set to an updatable state. When the state matching query is positive, it may be possible to enter an update mode (e.g. the device can enter an update mode and/or updatable state). The state matching query may be such that the state of the device is determined to be suitable (or unsuitable) for an update, such as being in a quiescent state and/or an unpowered state (or working state). For example, a suitable state can be a state other than a D0 state. An example of an unsuitable state is a D0 state.

For example, when the state matching query is positive, the apparatus can cause copying of the context of the device into a system memory. The device can be set to the updating state. After setting the device 150 to the updating state, the device can be determined to be ready for the update. Alternatively/additionally, the device 150 may undergo additional operations in the updating state before the device is ready (e.g. copying of the context and/or resetting of the device). For example, there is first a state matching query that is positive, then there is a determination that the device is ready for the update.

When the device is ready for the update; the device can be set to the updating state. If the device is not ready, the firmware update can be postponed, e.g. until after the context is stored and/or resetting of the device.

If the state matching query is negative, the update can be postponed, e.g. until a positive state matching query result.

The update mode (e.g. the updating state) may include operations that are otherwise impossible if the state matching query is negative and/or the state of the device is unsuitable for updating. It can be undesirable to try to update the firmware for a device 150 that is under operation.

When the device is in the update mode, or updating state, the context of the device (sometimes referred to as state of the device, device state, and/or device context) can be copied into volatile memory, such as the reserve memory.

The copying of the state and/or device context may allow for suspension and/or delay of the operation of the device, such as in order to begin to execute the update, e.g. the testing of the update firmware. Alternatively/additionally, when the device is reset, which may be after the firmware update is stored in the reserved memory, the device can load the firmware update from the reserved memory.

In an example, when the update is postponed, the apparatus can cause the firmware update code to be stored in a secondary firmware bank 172, e.g. at least temporarily (such as until the update can proceed, at which time the firmware update code can be put in the primary firmware bank 171, e.g. during testing 120).

Figure 4:
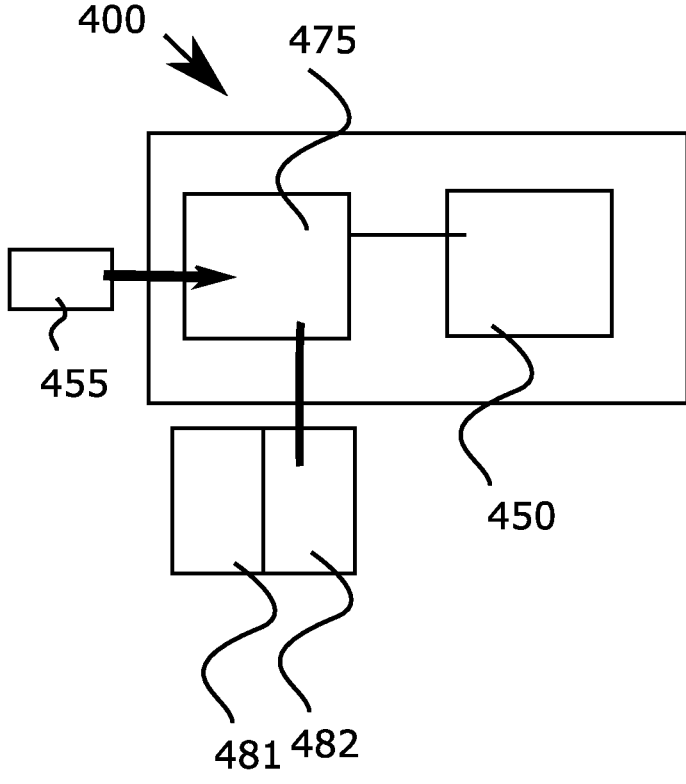
FIG. 4 illustrates a device with updatable firmware and an apparatus.

FIG. 4 shows an apparatus for managing handling of a firmware update for a device. The apparatus 400 and device 450 described with reference to FIG. 4 is expressly combinable with those described elsewhere herein, particularly those described with reference to FIGS. 1B and 3. The methods described herein can be performed by the apparatuses and/or devices described herein, e.g. those of FIGS. 1B, 3, and 4, as well.

The apparatus 400 can determine a device 450 to be in an updatable state, and may cause the device 450 to be set into an updating state after determining the updatable state. After the device is in the updating state, the apparatus 400 can cause the firmware update 455 (e.g. the code thereof) to be written to a memory 475 for the device (e.g. a reserved memory 175). After writing the firmware update to memory 475, the device is switchable to a working state in which the device operates based on the firmware update. An advanced configuration and power interface can be present, e.g. as part of the apparatus 400, for determination of the updatable state of the device 450.

It is possible that, while the device 450 is in the updating state, any access request(s) can be queued. For example, the apparatus 400 causes the access requests for the service(s) of the device 450 to be queued, e.g. during the updating process. Once the updating is complete, the queued requests can be handled by the device 450, e.g. serially.

Before the device is determined to be in the updatable state, the device can be switched into at least one of: an idle state, a low power state, a power conserving state, or an off state; subsequently, the device 450 can be regarded as being in an updatable state.

In the examples herein, it can be possible that the device 450 is switchable to the working state, e.g. after the firmware is updated for the operation of the device 450, without a reboot of the apparatus 400.

The apparatus 400 can transmit an update request to the device 450 which includes a state matching query. When the query is positive, the device can be caused to enter the updating state. If negative, the update can be postponed.

In the updating state, the apparatus may cause copying of a context of the device into a system memory. The apparatus may determine if the device is ready for the update. If the device is ready, the apparatus 400 can cause the device 450 to be flagged as being in an updating state. If the device is not ready, the apparatus 400 can postpone the update.

When the device 450 is updated with the firmware update, the device 450 can resume operation. For example, the device 450 can reload the context that was saved, and resume operation. In another example, the update is rejected, and the context that was saved is reloaded and the operation of the device 450 resumes using the previous firmware before the update.

It can be desirable to be able test the firmware update and resume operation of the device 450 without rebooting the apparatus 400, e.g. regardless of the outcome of the test 120.

When the test 120 is passed, it is possible to write the firmware update to nonvolatile memory. For example, the apparatus 160 can cause the writing of a the firmware update to nonvolatile memory 180. In another example, the firmware update can be partitioned. For example, a first part of the firmware update is written to a serial peripheral interface NOR memory, and a second part of the firmware update is written to a boot partition. The first part can be is data (which may be less likely to be altered and/or updated later) and the second part is can be code (which may be more likely to be altered and/or updated later). Alternatively/additionally, the first part is configured for more infrequent updating than the second part.

Figure 5:
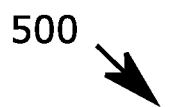
FIG. 5 illustrates a method of handling a firmware update for a device.
Figure 5:
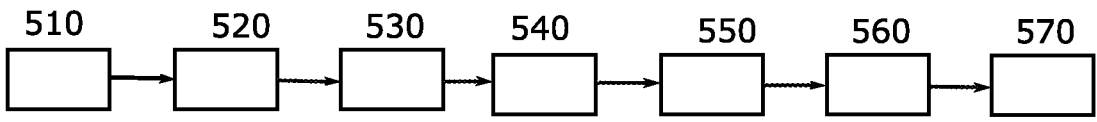

FIG. 5 illustrates a method of managing a firmware update for a device. The method 500 described with respect to FIG. 5 can be combined with other methods described herein, for example, with that of FIGS. 1A, 2A, and/or 2B, and with the apparatuses and devices described elsewhere herein, e.g. at least FIGS. 1B, 3, and 4. The features described with respect to the methods illustrated in FIGS. 1A, 2A, 2B, and 5 are expressly combinable and such combinations are particularly contemplated, also with the functions described with respect to the devices and apparatus described herein, particularly FIGS. 1B, 3, and 4.

The method 500 can include maintaining 510 an operational state of a managing apparatus during the management of the firmware update. The method can include determining 520 a device to be in an updatable state, and setting 530 the device to an updating state. The method can include storing 540 a firmware update code in reserved memory. The method can include testing 550 the device based on the firmware update code (e.g. the code in the reserved memory which may be volatile memory, RAM, DRAM and/or SRAM). The method can include determining 560 a result of the test. For a pass, the firmware update code can be written 570 to nonvolatile memory. For a fail, the firmware update can be postponed and/or rejected.

The method 500 can alternatively/additionally include determining the device to be in a working state before determining the device to be in the updatable state. The firmware update code can be stored in a secondary firmware bank of the reserved memory before determining the device to be in an updatable state. The method can include relocating the firmware update code out of the secondary firmware bank to a primary firmware bank of the reserved memory before the testing.

The method 500 can alternatively/additionally include halting operation of the device, saving a context of the device, resetting the device, loading the firmware update code from a primary firmware bank of the reserved memory, restoring the context of the device, and/or resuming the operation of the device.

The methods described herein can be carried out by a computer. Instructions for the methods described herein can be stored in computer readable format which, when executed can cause an apparatus or device to operate as described herein. For example, computer instructions may cause an apparatus to manage a firmware update for a device, as described herein. Computer instructions for executing the methods herein may alternatively/additionally take the form of an update driver and/or agent. For example, a drier may be packaged with a firmware update. Alternatively/additionally, a firmware update agent may be utilized. The agent may act as an interface to the driver, receiving and responding to notifications on new updates. The agent may verify the firmware update before the update is downloaded to the respective apparatuses and/or devices. The agent may download the verified firmware into a reserved memory (e.g. a protected memory region). The agent may determine, receive or transmit information that the update is available. The agent may host and/or initiate tests, e.g. function targeted BIST testing process to the device(s), particularly while monitoring response of such BIST results (test results).

Herein, the firmware update can be downloaded to a reserved memory (e.g. a protected memory), such as by the update agent. The reserved memory can be, for example, a region in the system DRAM, which may have limited access. For example, the reserved memory is accessible only to the update agent, the device being updated, and/or static RAM inside the device. The reserved memory may be a temporary memory location for storing the firmware update prior to being written into nonvolatile memory.

Herein, the term "IP" may be used interchangeably with a device which is possible to update with a firmware update. The device may be a hardware device or a virtual device such as one defined by software, e.g. a functionality or group of functionalities coded in software.

Herein, the apparatus can include a computer processor, a central processing unit, a system on a chip, a hardware microcontroller, and/or a security engine, for example.

Returning to FIG. 1B as an aid to understanding, the apparatus 160 can, such as after causing copying and/or storing of the firmware update code in the reserve memory 175, determine if the device 150 is ready for a firmware update, particularly if the device is ready for testing of the firmware update. For example, the device 150 may be reset, e.g. put into a quiescent state such as an initial state. The device can be flagged as being in an updating state, e.g. after the determination that the device is ready and/or the reset. Being flagged as being in an update state may protect the test from being corrupted by inputs/outputs and/or data transfers with the device other than those which are part of the test. For example, when the device in normal operation, the device may communicate via inputs/outputs. Communications with the device can be suppressed, delayed, queued, and/or refused while the device is in the updating state and/or when the testing is underway. For example, processes (e.g. externally linked processes) which might alter inputs/outputs to the device that are not part of the testing 130 may be canceled, refused, queued, and/or delayed.

It is also possible that, after a state matching query is determined positive, the device 150 is determined to be unready for the update. In such a case, the update can be postponed/delayed. Similarly, when the state matching query is negative, the update can be postponed/delayed. Postponing/delaying the update can trigger another logical setting which can result in a later state matching query. During postponement/delay of the update (e.g. postponement/delay of the testing 130), the firmware update can be stored in the secondary firmware bank 172.

The testing 120 of the device using the firmware update in the reserved memory 175 can include confirming the operation of the device, such as by comparing expected outputs with actual outputs. For example, a test-input is provided to the device and the device is operated using the firmware update to generate an actual output. The actual output is compared to an expected output. The comparison may result in a pass or fail result. For example, the update can proceed with writing the firmware to nonvolatile memory upon a pass result. In the case of a fail result, the firmware update is possibly rejected. When the test fails, the update can be canceled, for example. Alternatively/additionally, a communication and/or log that the test failed can be sent/recorded.

Alternatively/additionally, if any difference between the actual output and the expected output is tolerable, e.g. within an acceptable error, the test can be passed. It is possible that the acceptable error is 0 such that the actual output is exactly as the expected output otherwise the test fails. When the test fails, the update can be canceled, rejected, and/or postponed, for example. When the test succeeds, the firmware update can be written to nonvolatile memory. The device can be exited from its updating state. The device can be made ready for normal operation using the updated firmware.

As mentioned herein, there may be more than one device impacted directly and/or indirectly by an update. For example, one or more primary device may each be directly impacted by a firmware update, such as when a firmware update includes code and/or data for updating the firmware for the operation of the primary device(s). One or more secondary device may each be directly impacted by a firmware update, such as when a firmware update includes code and/or data for updating the firmware for the operation of a primary device(s) which is communicatively coupled to one or more secondary device(s). For example, when a primary device and a secondary device communicate such as transfer and/or share data, the secondary device may be operated such that the data received from the primary device is expected to be in a first format. If the data received from the primary device is actually in a different format, such as a second format, the secondary device may be unable to correctly function and/or be unable to provide sensible output. The testing may determine if the firmware update alters the format of data output from the primary device; alternatively/additionally, the testing may determine if the operation of the secondary device is changed such as if the secondary device is functioning correctly when the primary device is operated based on the firmware update. During testing, the secondary device may be determined to be functioning correctly when the actual output of the secondary device matches or is within a tolerable range of an expected output.

A firmware update which is directed toward updating the function of a primary device may possibly alter the format of one or more outputs. The testing 120 may determine that the firmware update changes the format of the output of the primary device.

When a test fails, the firmware update can be rejected. For example, when the testing 120 shows that the actual output of at least one of the primary or secondary devices is not within a tolerable range of an expected output, the test fails. When the test fails, the previous firmware of the nonvolatile memory may be left intact. The previous firmware, e.g. the firmware for the device which was stored before the update firmware update was received, may be used to operate the device. A communication can be sent which indicates the rejection of the update, the failure of the test, and/or that the firmware update is not written to nonvolatile memory.

When the test succeeds, the firmware update can be accepted such as by writing the firmware update to nonvolatile memory such that the device is configured to operate using the updated version of firmware. A communication can be sent which indicates the acceptance of the update, the passing of the test, and/or that the firmware update is written to nonvolatile memory. Writing the firmware update to the nonvolatile memory can be delayed, for example, until services and/or operations of the device are completed. For example, while the testing was performed, the instructions for operation of the device were received; the instructions may be delayed and/or held until the testing 120 is accomplished; the device may be operated based on the delayed and/or held instructions after the testing, using the updated firmware (e.g when testing succeeded) or the previous firmware (e.g. when testing failed) in the reserved memory, e.g. before the writing of the firmware update to the non-volatile memory (e.g. when testing succeeded).

When writing the firmware update to the nonvolatile memory, the firmware update can be split into at least two parts. A first part can be written to a nonvolatile memory component such as flash memory such as SPINOR. A second part may be written to, for example, a SSD, hard drive, boot memory, and/or boot partition. For example, the first part can be a data block of the firmware update, such as data and/or data which is relatively seldom updated. The second part can be code which is relatively more frequently updated. the second part can be written to a SSD, hard drive, boot memory, and/or boot partition. The first part can be data which is relatively seldom updated in comparison to the second part which is more frequently updated in comparison to the first part.

Herein are disclosed methods for firmware patching, as well as apparatuses for firmware patching. The methods herein may reduce difficulties encountered with the updating of devices. Firmware updates are sometimes ignored by users due to the inconvenience of updating. This can leave computer systems and devices vulnerable to security breaches, for example. The methods, apparatuses, and devices disclosed herein may improve security of devices and systems and/or reduce inconvenience to users.

Modern computer systems can have several firmware components, for example basic input/output system (BIOS), security controller firmware, microcode, power management firmware, etc. Security attacks on firmware components, which may include below the operating system (OS) attacks, are on the rise and this results in loss of revenue to businesses due to hazards to productivity and leaks of business data. Mitigating these attacks can be done by sending firmware updates or patches to the systems in-field.

Typical in-field patching may involve several steps, starting from implementation, validation, and deployment, followed by original equipment manufacturer (OEM) validation and deployment, and finally launching an update through OEM or update portals or enterprise IT.

Figure 6:
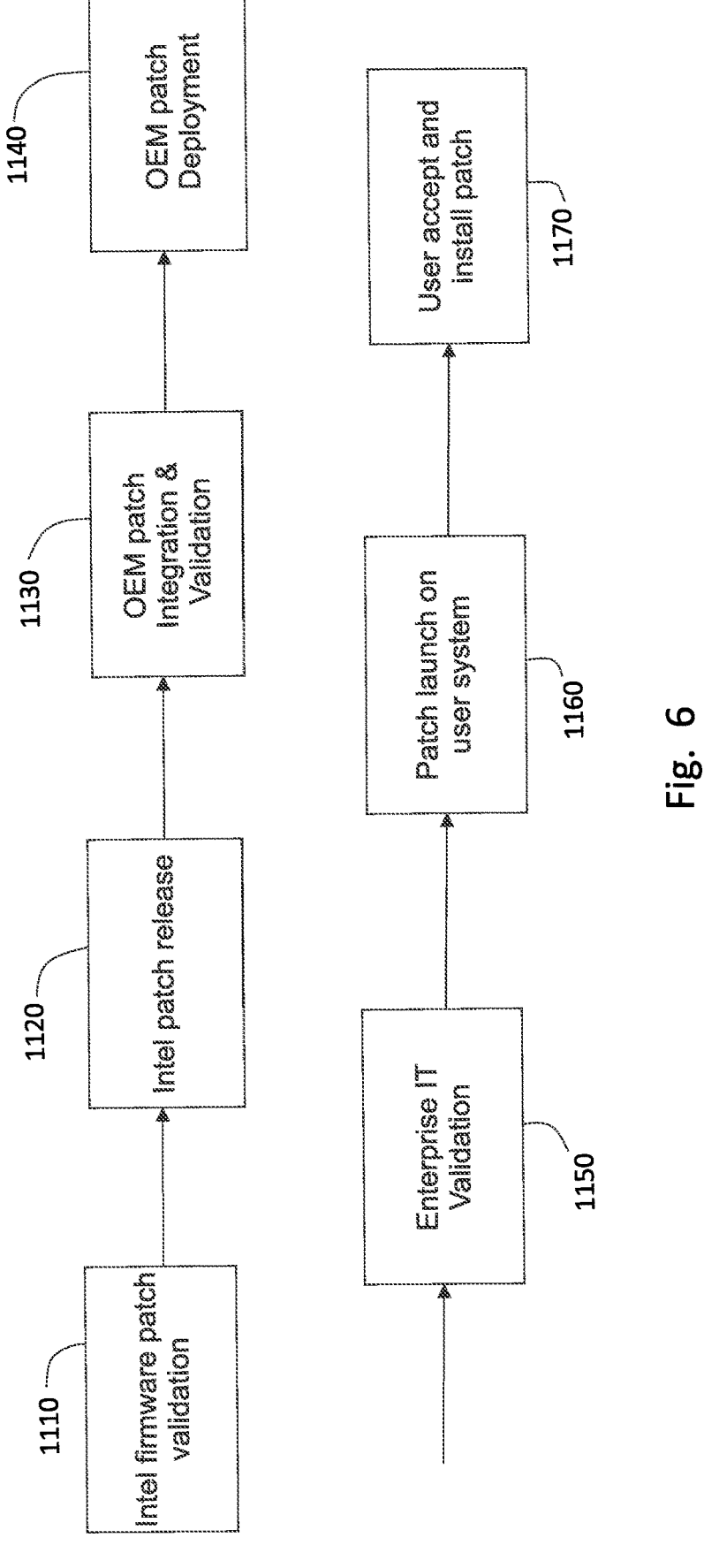
FIG. 6 shows a firmware patch deployment.

FIG. 6 shows a firmware patch deployment. A patch is validated 1110, released 1120. An OEM/ODM may integrate and validate the patch 1130, and subsequently deploy 1140 it. There may be a further validation, e.g. an enterprise IT validation 1150, then the patch is launched on a user system 1160. Finally, in the example of FIG. 6, the user accepts and installs the patch 1170.

Figure 7:
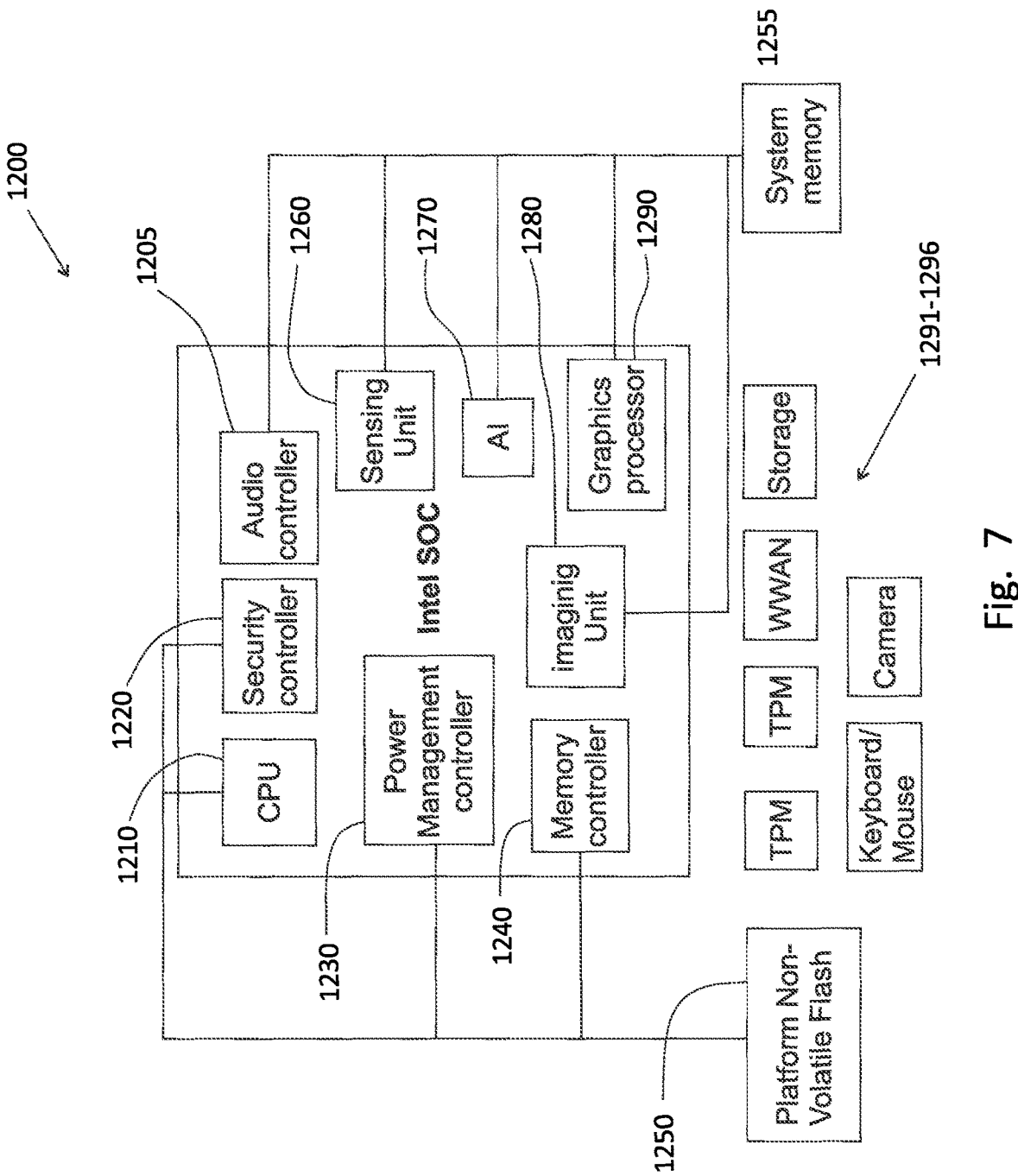
FIG. 7 shows an apparatus.

FIG. 7 shows an apparatus 1200, such as a system on a chip 1205. As seen in FIG. 7, a system on a chip (SOC) 1205 can have a number of firmware components. Firmware may be on nonvolatile memory 1250, such as the platform flash 120. Firmware may be updated at boot time, for example. Herein, it is possible to update firmware of devices possibly without rebooting the apparatus 1200.

The apparatus may include one or more of a CPU 1210, security controller 1220, power management controller 1230, and memory controller 1240, which may be in communication with nonvolatile memory, e.g. the flash 1250. The apparatus may additionally include or be in communication with devices such as an audio controller, sensing unit 1260, artificial intelligence (AI) chip 1270, imaging unit 1280, and/or graphics processor 1290, which may be in communication with system memory 1255. Additional devices 1291-1296 can also be in communication with the apparatus 1200, such as trusted platform module(s) (TPMs), wireless wide area network (WWAN), storage, keyboard(s), mouse(s), and/or camera(s).

Attempts to make firmware patching simpler and in runtime is difficult. Attempts can have failed in the past due to lack of trusted runtime services to access serial peripheral interface NOR (e.g. SPI-NOR flash, SPI-NOR, or SPINOR) from operating system (OS) layer to update device firmware (IP FW). Some device firmware (herein also referred to as IP FW) can be part of BIOS image hence it can possibly be necessary to reboot the system to pursue OS initiated BIOS update using HOST CPU based loading.

If due to some reasons, updated BIOS fails to boot to OS, it can possibly be necessary to roll back to older BIOS. Rollback can be undesirable, e.g. for wasting time by writing into SPINOR for BIOS update (including IP firmware like discrete graphics (GFX) or artificial intelligence (AI) chip). Such rollback/recovery can be disruptive to users and can contribute to a perception that there is risk to firmware updates.

Firmware patching can imply writing mutable code in the nonvolatile storage (NVStorage) in the field (e.g. after the platform has shipped). The process of writing the firmware to the NV Storage can be critical for platform boot, e.g. subsequent platform boot. The patching process can be atomic, or may be expected to be atomic. A failed write can brick the platform. If the patching process is aborted before completion, the platform can go into an un-recoverable state, thereby damaging the user experience of the platform. As the size and complexity of firmware increases, it becomes harder to enforce the atomicity while minimizing the errors in the firmware. Since PCs support multiple NV Storage devices, there can be multiple mechanisms of delivering the firmware to the field and even more complex mechanisms of writing the firmware to appropriate NV Storage. It is possible to minimize the probability of bricking the system by testing the firmware in volatile memory before committing it to NV storage, as described herein.

Firmware patching can be complex in nature, such as in comparison to software updates. Firmware patching/updating can include writing to platform non-volatile storage (e.g. flash) on a target device, such as is described herein. A failure during or post update could result in failure of system to boot. This can incur significant cost to the OEM to fix the systems, and can lead to loss of business productivity. Therefore, OEMs and IT may invest efforts in validation before the patch is deployed. Costs can be driven up due to the effort of meeting validation goals before updates/patches are released.

Some OEMs may be unable to bear the cost of extensive validation. Patches/updates may ship much later in the life of the product. There can be risk to the end users that possess unpatched systems, such as against public vulnerabilities. Furthermore, there can be a general hesitation among users to apply a patch to their system, out of fear of failure. Systems can be at risk despite all the cost and effort put into mitigating vulnerabilities.

Herein, reduction of the risk associated with in-field firmware patching is sought by providing a better architecture for easier pre-deployment and validation of firmware patches on end user systems. Alternatively/additionally, by addressing the possible inability to service device and/or IP firmware at runtime today through device and/or apparatus (e.g. SOC) architecture differentiation, higher adoption of the firmware patches amongst OEMs and end users may be possible. Greater adoption of firmware updates, such as by downstream parties such as OEMs and/or users, may make devices and/or computer systems more secure.

Herein are described methods and apparatuses which may reduce the need for additional backup firmware, such as may use additional flash space on the device.

Herein is described software-based patching which may include firmware patches stored in reserved and/or temporary memory (e.g. DRAM). It is possible to use hardware architecture to load and run firmware from reserved, temporary, and/or protected memory (e.g. during runtime). The use of reserved, temporary, and/or protected memory may be in addition to the use of flash, or may be instead of flash (such as during boot).

Described herein are apparatuses and methods which may allow staging of firmware on the end user platform. Opportunities for rollback may be possible if the firmware is unfit for the platform. The methods and apparatuses described herein may increase user confidence and adoption, and/or may improve the health of the platforms in the field. It also may be possible to implement crowdsourced validation by enrolling beta testers in the field.

It may be possible to reduce the bill of materials using apparatuses and/or methods as described herein. The devices and/or apparatuses disclosed herein can aid in a seamless firmware update. For example, it may be possible to forgo a shutdown or reboot. A device may be updated without interruption, and/or so that the user is not aware of any interruption of device capabilities. It may be possible to have a single write into SPINOR upon successful completion of firmware (FW) update, which can be an improvement over methods that may use multiple writes (into SPINOR, for example). It may be possible to simplify development and/or validation, for example. The apparatuses and/or methods described herein may be applied to at least one of hardware (HW), FW and software (SW). The apparatus may be included in a SoC.

Herein is disclosed a firmware update architecture. The architecture can include one or more of an update driver, an update agent, a reserved memory, and a device. The driver can be a signed driver and/or a firmware update driver, that can be packaged with the firmware patch, e.g. a firmware update for updating in the system. The update agent can be a hardware component on the SOC. The update agent can have multiple roles in the architecture. The update agent can do any one or more of the following (a through e):

a) act as an interface to the driver, receiving and responding to notifications on new updates b) verify the new firmware update before the update is downloaded to the respective IPs c) download the verified firmware into Protected IP memory region d) notify the IP that new firmware is available e) host and initiate function targeted built-in self-test (BIST) testing process to the IP while monitoring IP response of such BIST results.

The role of update agent can be included in the apparatuses as described herein, e.g. in a System on a Chip (SOC), a Converged Security Engine (CSE) and/or a processor (such as a CPU). A CSE can expose a runtime interface to a host to receive the firmware payload. Alternatively/additionally, the CSE can provide security services for verification. The Update Agent, CSE, and/or processor can write to flash storage to update the firmware.

Alternatively/additionally, the update agent described herein can be coded into a machine readable instructions, and optionally included in an apparatus such as those described herein. The update agent may work synergistically with a firmware update which may include an update driver as described herein, to manage the firmware update for the device.

A protected memory and/or reserved memory may be present, such as in system dynamic random access memory (DRAM). The protected memory may include a memory region which can be where the Update Agent downloads the firmware (e.g. to a reserved region which, as described herein, may be partitioned). Alternatively/additionally, the firmware can be downloaded to a temporary memory location. For example, a region in the System DRAM which is accessible to the Update Agent, the firmware can be used, or a Static RAM of the device for which the firmware update is intended.

The device can be a component on an apparatus such as one including a SOC, for example, or may be a device communicatively coupled to the apparatus. The firmware may be directed toward updating the code and/or data for operating the device. Herein, it is shown to be possible to load and run firmware from reserved memory during runtime instead of flash (during boot).

Figure 8:
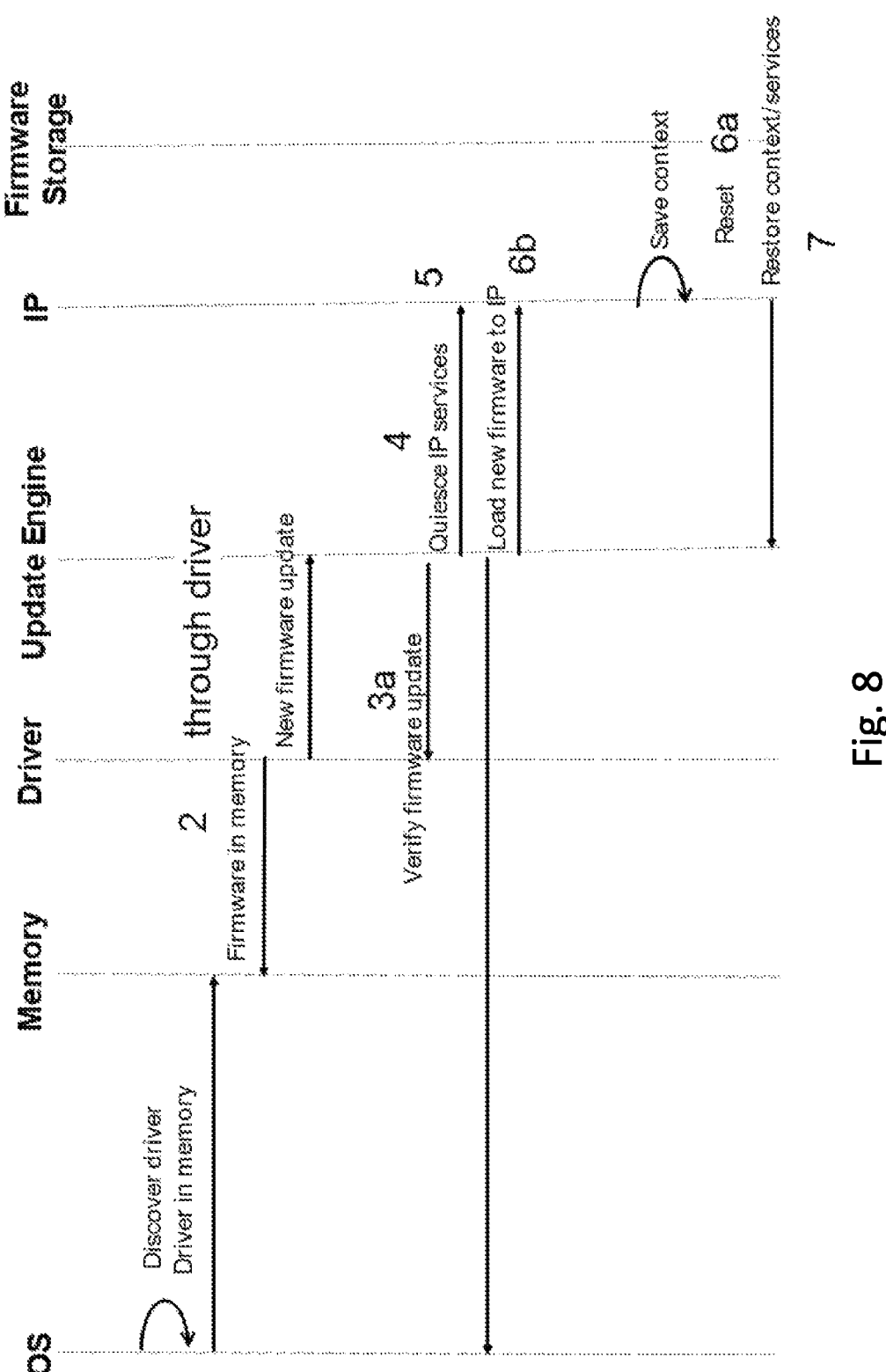
FIG. 8 shows schematically a method of updating.

FIG. 8 illustrates a method of updating. Alternatively/additionally, FIG. 8 may be regarded as a high level flow of runtime patching. Firmware patching can include signing and deploying a new firmware update driver which may be packaged along with the firmware patch.

The update may start with signing and deploying the driver and/or patch.

The update driver can be subsequently installed in the apparatus and/or system. As part of installation, the driver may install the firmware and/or firmware package in memory. The Update Agent may be notified of the firmware being installed in memory (e.g. the reserved memory). Alternatively/additionally, there may be notice to the update agent of the availability of the firmware update. The Update Agent can verify the firmware update and/or download it to a memory location, e.g. reserved memory. The Update Agent can communicate with the device such as to notify the device of the firmware update. The device can do any one or more of: halt ongoing services, save the current context of the device, and be reset, such as by self-action. Alternatively/additionally, the apparatus (e.g. by operation of the update agent) directly or indirectly causes the device to halt, save context, and/or reset. At a next reset, the device can load the verified firmware from memory. The device can restore the context and possibly resume previous services. For example, the following sequence can occur after the update agent verifies and/or downloads the firmware update. (Herein "IP" and "device" may be used interchangeably.)

1. The Update Agent then notifies the IP of the new firmware.

2. The IP halts any ongoing services, saves its current context and resets itself.

3. At the next reset, the IP loads the new verified firmware from the memory.

4. The IP restores its context and resumes all previous services.

In an example, there is a driver based update of platform firmware. Driver updates can be used to update device specific drivers, and/or device firmware. A system driver can update platform firmware components like Security controller firmware, and/or I/O firmware.

Herein is disclosed an update method that uses temporary memory. A rollback to a previous firmware can be similar to that of a driver rollback. By selecting a previous version of the firmware update driver, the user can easily rollback to the older driver and/or the previous version of the firmware package that is part of the driver. The firmware download as part of the rollback flow, will go through verification and/or notification processes, such as is described herein (e.g. with FIG. 2).

Device quiescing and device Only Reset are possible. It is possible to use the capability of devices to reset themselves and re-fetch their firmware on power up. When a device is performing services, such as services that cannot be paused (e.g. critical services), the update agent can download the firmware to a secondary firmware bank.

In another example, device runtime patching is implemented.

For example, during the SoC boot up phase, several devices can be performing their initialization operation. There may be a mode, such as "FW Init Mode." In the FW Init mode, the device may not be able to provide runtime services, e.g. the device may be busy. It is possible that, prior to handing over to the OS, all devices will enter "Normal Operational Mode", where it can support runtime communication.

The challenge in this mode compare to "FW Init Mode" is that, during runtime, IP might need to support normal runtime communication and provide a way to perform FW update without impacting the user scenarios.

Figure 9:
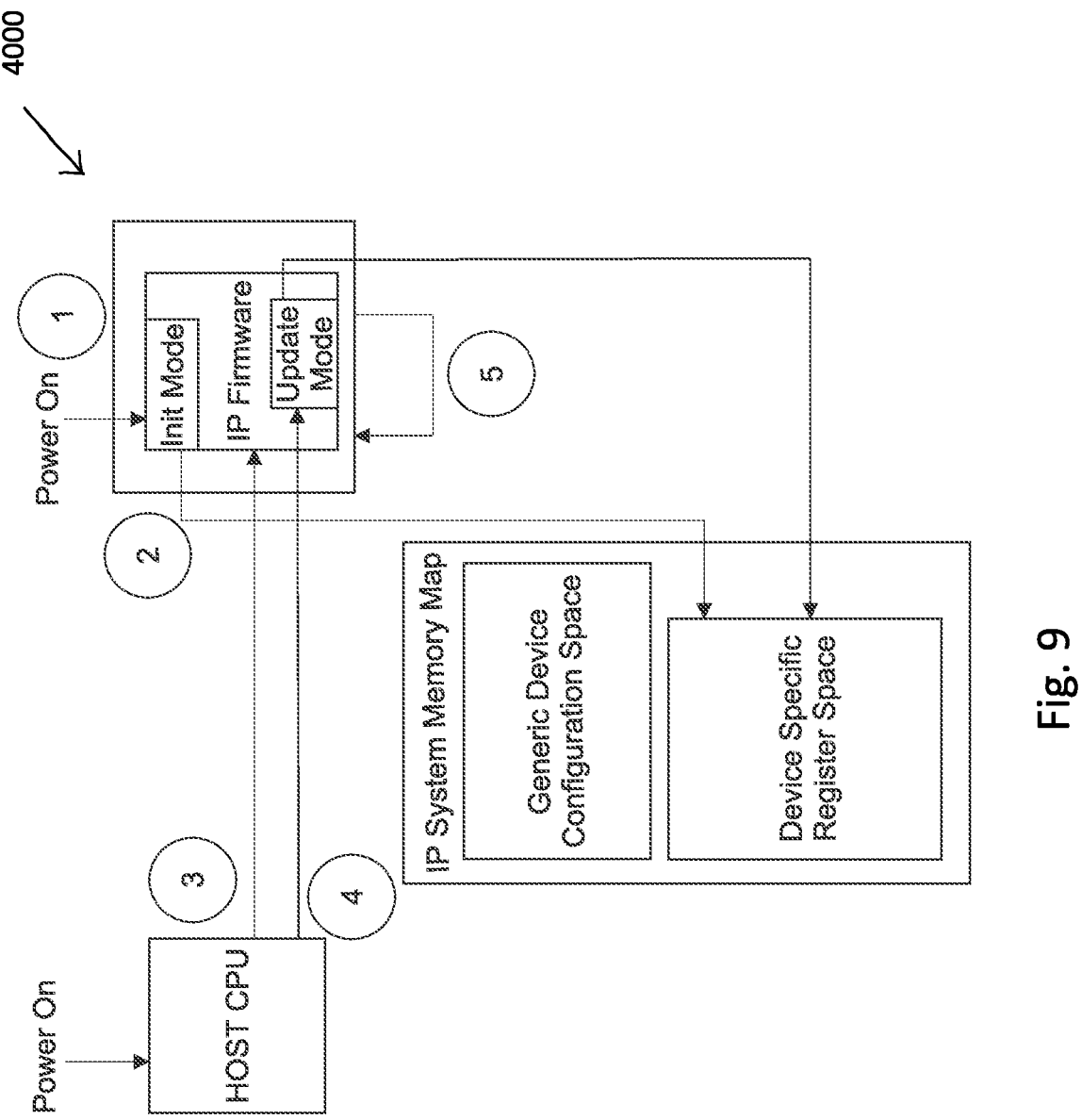
FIG. 9 illustrates an apparatus schematically.

FIG. 9 illustrates, schematically, an apparatus 4000. FIG. 9 may represent a high level architectural diagram that supports an update mode (or updating state).

In an example, after Power-ON reset (1, top right of FIG. 9), along with HOST-CPU (top left), the firmware sitting in the device may start its execution.

The device ("IP") can remain in "Init Mode" (2 in FIG. 9) At this stage, the device may not be ready for host-based communication. During the initialization process, the device can update its device register space which may reside in the device memory, e.g. without being shadowed and/or copied into system memory.

Based on design recommendation, the host CPU (3 in FIG. 9) can attempt to send a communication, which can be a first communication. The host CPU can enumerate the device resources into system memory, e.g. so that the CPU can be ready to perform runtime operations. This stage can be known as "Normal Operational Mode" for device. At this stage, the host CPU may not be booted to OS.

After receiving the new FW update, the host CPU can send (4 of FIG. 9) a firmware update request (e.g. a runtime firmware update request) based on device usage knowledge/ information, e.g. after determining the state of the device, e.g. whether it is in an updatable state and/or if a state matching query is positive. For example, see also FIG. 8.

For example, if the desired device state for the FW update is matching (see 5 of FIG. 9) with current IP device state, the OS updater driver can perform the register programing, e.g. as part of _PSU to allow the device to enter "Updater Mode". In Updater Mode mode, device firmware can copy its device context into system memory. Copying context into system memory can allow performance of the runtime operational request and/or initiate the FW update. Upon successful completion of FW firmware update (e.g. if test(s) are passed), the device can refresh the register (e.g. the device specific register space) and/or the firmware update can be written to nonvolatile memory. The device can enter "Normal Operational Mode".

The "FW Update mode" can be alternatively/additionally known as "DxUpdate" for OS drivers, e.g. an operational mode (alternatively/additionally an updating state). In the DxUpdate, updating state, and/or FW Update mode, the device may be partially inactive, and still get enough power to preserve the device context to support driver restoration. Alternatively/additionally, the device is powered adequately to perform the self-update. For example, in the state known as DxUpdate, the 'x' can refer to the "desire device state for update".

The DxUpdate mode may be such that the end user scenario is not negatively impacted. For example, the OS updater may have knowledge of the device state, e.g. the operational stage, so that IP Firmware can switch to "Updater Mode" without impacting any functional usage. In another example, device Firmware can be split, such as based on criticality. Splitting the device FW can be such that both the device FW code and data region are not part of SPINOR. It is possible that the device firmware is designed in such a way that IP FW data block is a separate entity than a bigger code region. The data block may be smaller in size, and may not need upgrading over time. The data block may fit into SPINOR. The bigger block may be the code region, which may need periodic update. The code region may reside in block device boot partitions. For example, the device firmware includes an updatable block and a nonupdatable block; the nonupdatable block is configured to be stored in the SPINOR. The updatable block can be stored boot partitions, e.g. of a SSD.

The device FW code block can get be updated using the OS runtime interface.

Figure 10A:
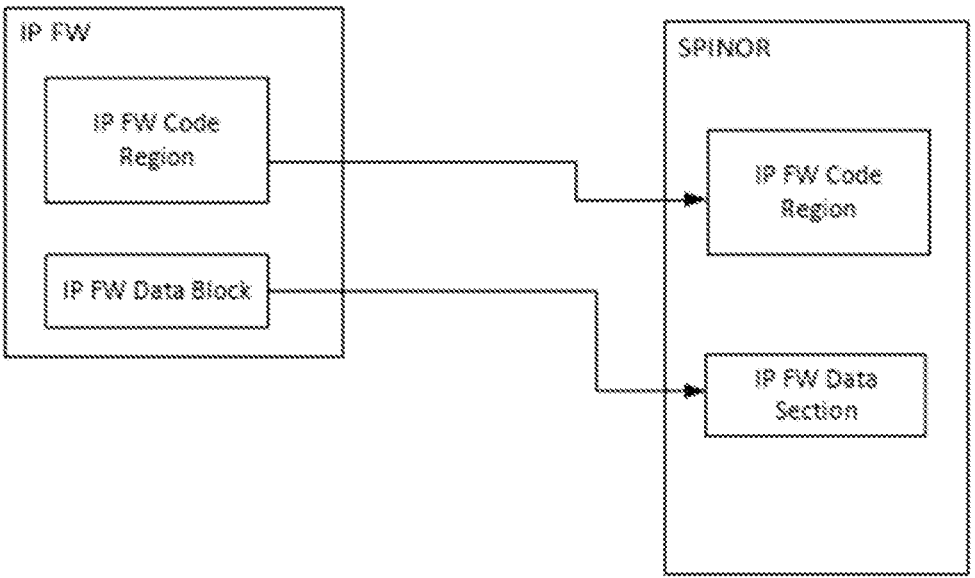
FIGS. 10A and 10B illustrate a comparison between device firmware design.
Figure 10B:
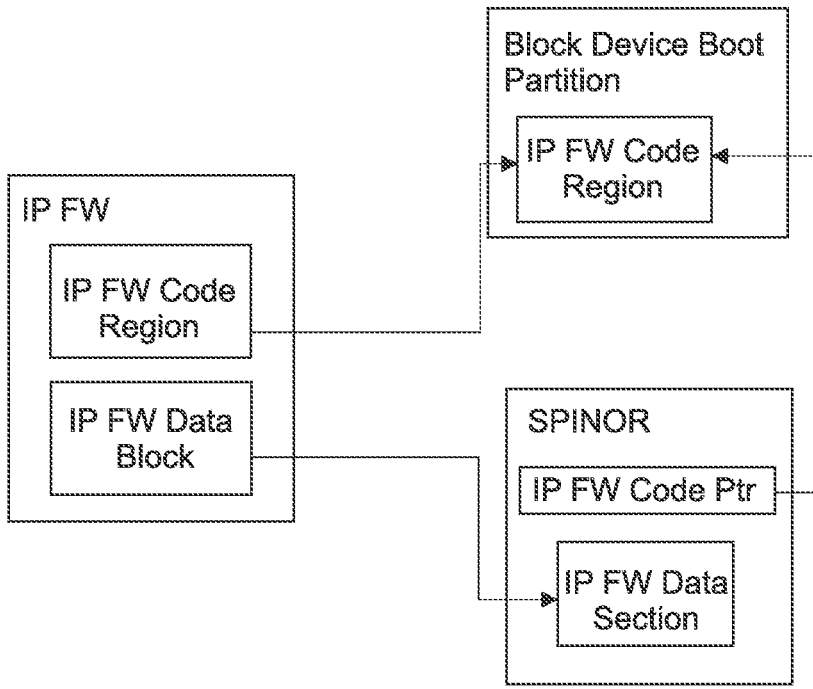

FIGS. 10A and 10B illustrate a comparison between device FW design. FIG. 10A shows the IP FW code region on the SPINOR. FIG. 10B shows the IP FW Code region in the device boot partition. For example, making a device FW data block reside in SPINOR can help to reduce the SPINOR growth year over year. Alternatively/additionally, not having IP FW update during boot phase would help to reduce the chances of higher boot time.

Figure 11:
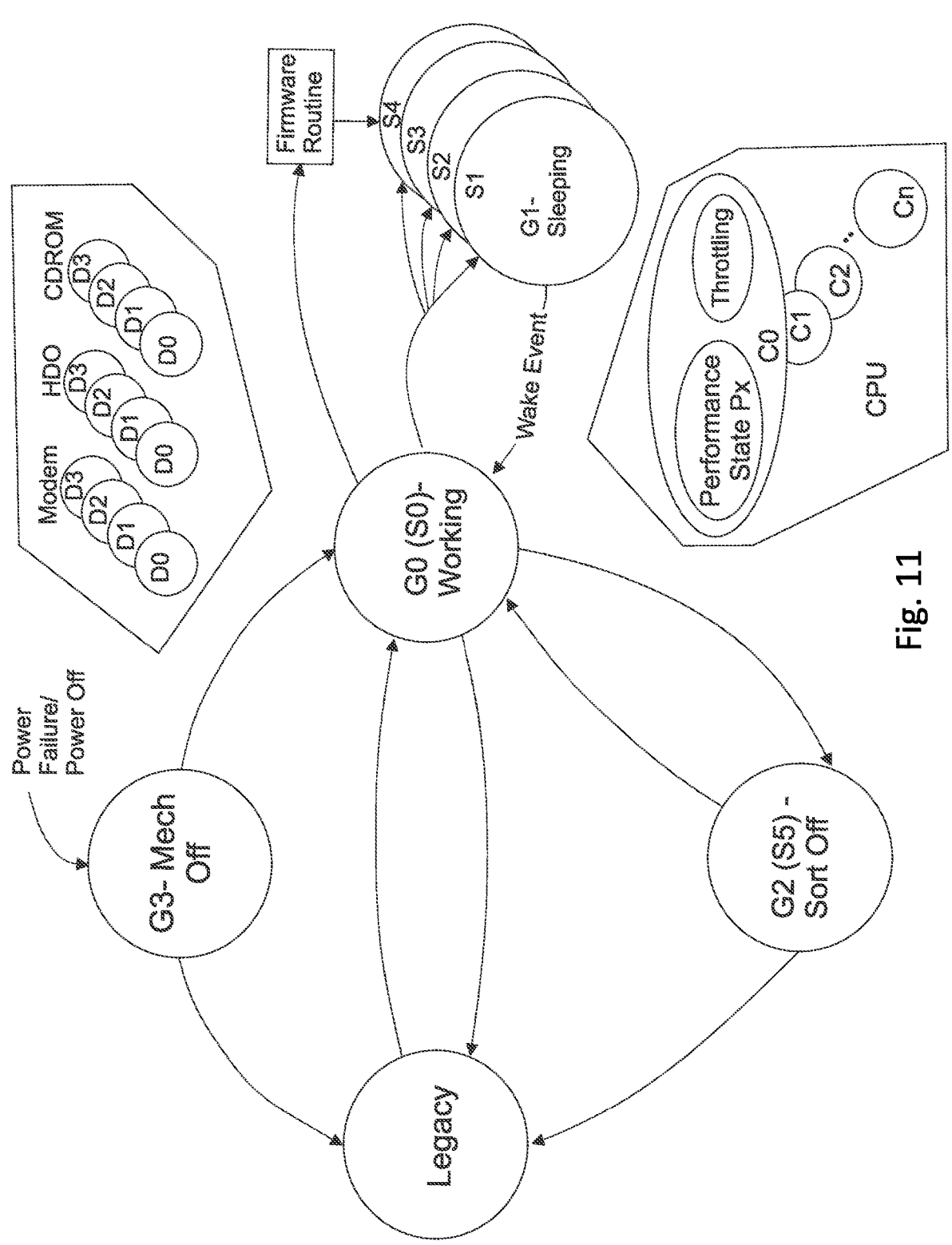
FIG. 11 shows a schematic of system and device power state transitions.

FIG. 11 shows a schematic of system and device power state transitions. FIG. 11 shows states G0, G1, G2, G3; S0, S1, S2, S3, S4; C0, C1, C2, Cn; D0, D1, D2, D3 of devices.

In another example, there is a device low power mode based update. A device and/or IP component, such as one embedded into SoC or hardware, may be visible to firmware or higher-level system software as a Device. A combination of devices can make a system. Each device can have power states, e.g. D0 (fully operational) to D3 (off) and intermediate device operational state as below. For example, D0: Operational state where device is active and responsive. The D0 state may retain all device context continuously.

D1 and/or D2 may be optional modes which provide better power savings compare to D0 states. The device might need to restore the device context, such as when entering/exiting D1/D2 states. D1/D2 modes may be used when the device is not in active use.

D3hot: Modern device FW may provide a D3hot mode in which the device does not require reinitialization upon restore from a deep sleep state. In a D3hot state, the device may maintain ample power to avoid renumeration upon request to enter D0 state.

Herein is also disclosed a device state known as "DxUpdate" which may be used to support runtime IP firmware update and/or ensure runtime device context preservation. Preserving device context may support at least some active communication with the device and/or a buffer associated with the device, such as the device at a lower power state. the device and/or buffer associated therewith can use device context copied into system memory.

For example, it is possible to avoid having a conflict of resources when OS updater performs an update of device FW while IP device is in use. Such as conflict may result in unpredictable behavior in the device operational state and may eventually impact user scenarios. Determining the device state before performing the update may be desirable in order to avoid unpredictable device behavior. For example, the device state and/or context is determined and stored prior to the update, e.g. prior to updating/replacing the firmware and/or testing the firmware.

For example, the state and/or context of at least one device (such as a plurality of devices of the SoC and/or hardware) and/or firmware codes for the device(s) is determined. The state(s) and/or context(s) may be gathered for up to all of the underlying devices/Ips, e.g. those devices embedded in the SoC or underlying hardware. Gathering the state(s) and/or context(s) can allow for scaling into various operating system, possibly without further modification. Advanced Configuration and Power Interface (ACPI) may be the underlying runtime layer between system firmware and system software (OS). The ACPI may gather the information, e.g. the state(s) and/or context(s) of device(s).

For example from the ACPI view, the devices can provide information, (e.g. context(s) and/or state(s)) about underlying hardware. The device(s) may also have associated access method(s), e.g. so that OS drivers can use the device(s) in generic way(s).

It is possible to extend the same concept for determining/knowing the required "Power State for Update" (PSU). An object can evaluate a device power state. The device can accept the firmware/IP update. It is also possible to put the device into "DxUpdate" mode (e.g. the update includes information for putting the device in the DxUpdate mode). The IP FW itself can perform self-update and preserve its device context without any additional help required from system software layer.

Here is an example of the implementation of the _PSU ACPI Object.

Argument: None
Return Value: A variable-length Package containing update information
Return Value Information

```
Package {
    Device_State_for_update        // Integer
    Update_Info                    // Package
}
```

"Device_State_for_update" can be an Integer that contains the device state information that can be used for issuing IP FW update. If device current operating state is not matching with "Device_State_for_update" then OS updater won't issue a FW update to that device/IP. For many devices, the "Device_State_for_update" can be >D0, which can ensure that the FW update will not impact the device working state, e.g. interrupt ongoing operations and/or cause unpredictable response.

"Update_Info" can be a package, such as one that includes information such as any one or more of: MSR, MMIO access, IO access, and PCI configuration access method to put the IP into "DxUpdate" mode.

Here is another illustrative example:

```
Device (FOO) {
    OperationRegion (MFOO, PCI_Config, 0, 0xFF)
    Field (MFOO, AnyAcc, NoLock, Preserve)
    {
        Offset (0x60),
        FUPD, 1,
    }
    Name (_PSU, Package ( ) {3, Package ( ) {FUPD, 1}}) // Here '3' can
    refer as D3 is minimum requirement for device to accept IP FW update,
    Write '1' into PCI configuration space offset (0x60) bit 0 help to put the
    IP into DxUpdate state.
}
```

Another example involves functional testing (BIST) prior to committing an update.

Figure 12:
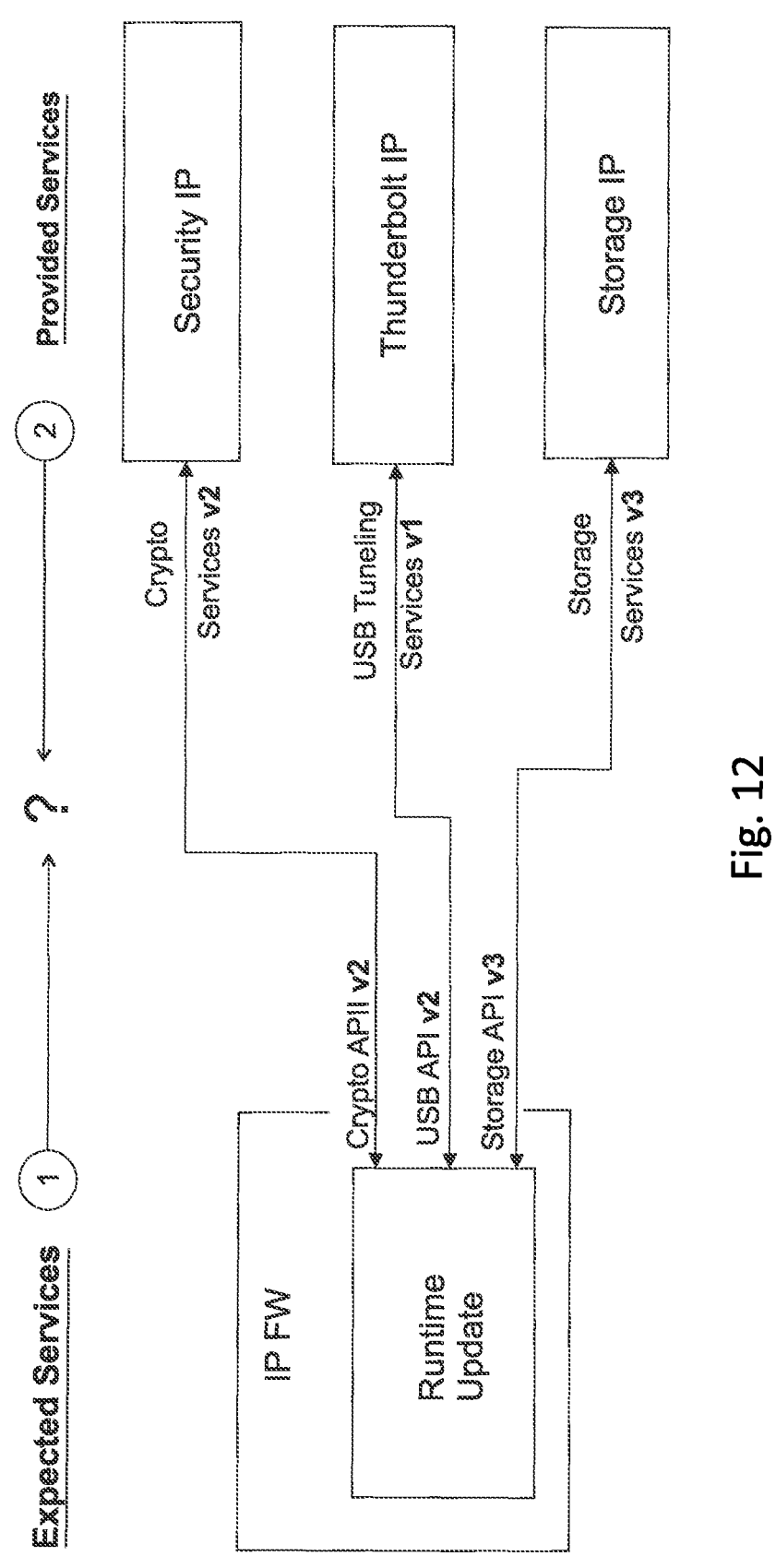
FIG. 12 shows a schematic of testing.

FIG. 12 shows a schematic of testing.

The integrity of the firmware can be tested and/or verified at runtime, for example. Functional verification may be traditionally handled during boot or by use of a target IP function. Devices can report dependencies/resource/services the device provides and/or receives from other IPs. Dependency mapping can be used to test compatibility of the runtime update firmware, such as by confirming that expected services vs. provided services (e.g. those services that are provided between devices) are compatible.

An example illustrates a device that expects services from security IP, thunderbolt IP, and/or storage IP. If an expected service from IP in category #1 of FIG. 12 ("expected services") requests a service in an unexpected format to IP from category #2 ("provided services"), this may compromise the cross IP functions. This can be handled by manual use-case testing by vendors and OEMs. As described herein, the dependency/API mapping can be tested, e.g. at runtime, as part of qualifying the update prior to committing the update, e.g. by writing to nonvolatile memory such as flash.

The test can confirm that devices maintain compatibility, e.g. a first and second device and/or primary and/or secondary device.

For example, when a device is updated such that there is a firmware change internal to that device, without impacting the interface to other devices, the API versioning may not be affected. In another example, when the update of the device FW changes the way services are provided between the device (e.g. a primary device) and another device (e.g. a secondary device and/or dependent device), then API versioning can be used to trace the change dependency and/or used during compatibility BIST test.

Another example is a method to implement a single write into the SPINOR on success.

Herein is disclosed a runtime mechanism to update device FW. There are, for example, types of device FW including code in the SPINOR that may be updatable. For example, a code update pointer may reside in SPINOR. The code update pointer may be updated. It is desirable to forego a reboot which may be part of In the existing processes of updating. For example, a reboot may allow a host CPU to update device/IP FW in SPINOR.

An update may involve multiple writes into SPINOR, such as writing based on corrections/changes in the update process. System firmware may be unable to boot to OS after updating IP FW into SPINOR. In such a case, a roll back may occur. It is possible that there are multiple SPI transactions and/or multiple writes to SPINOR. It is desirable to avoid wasting system resources and boot time.

Figure 13:
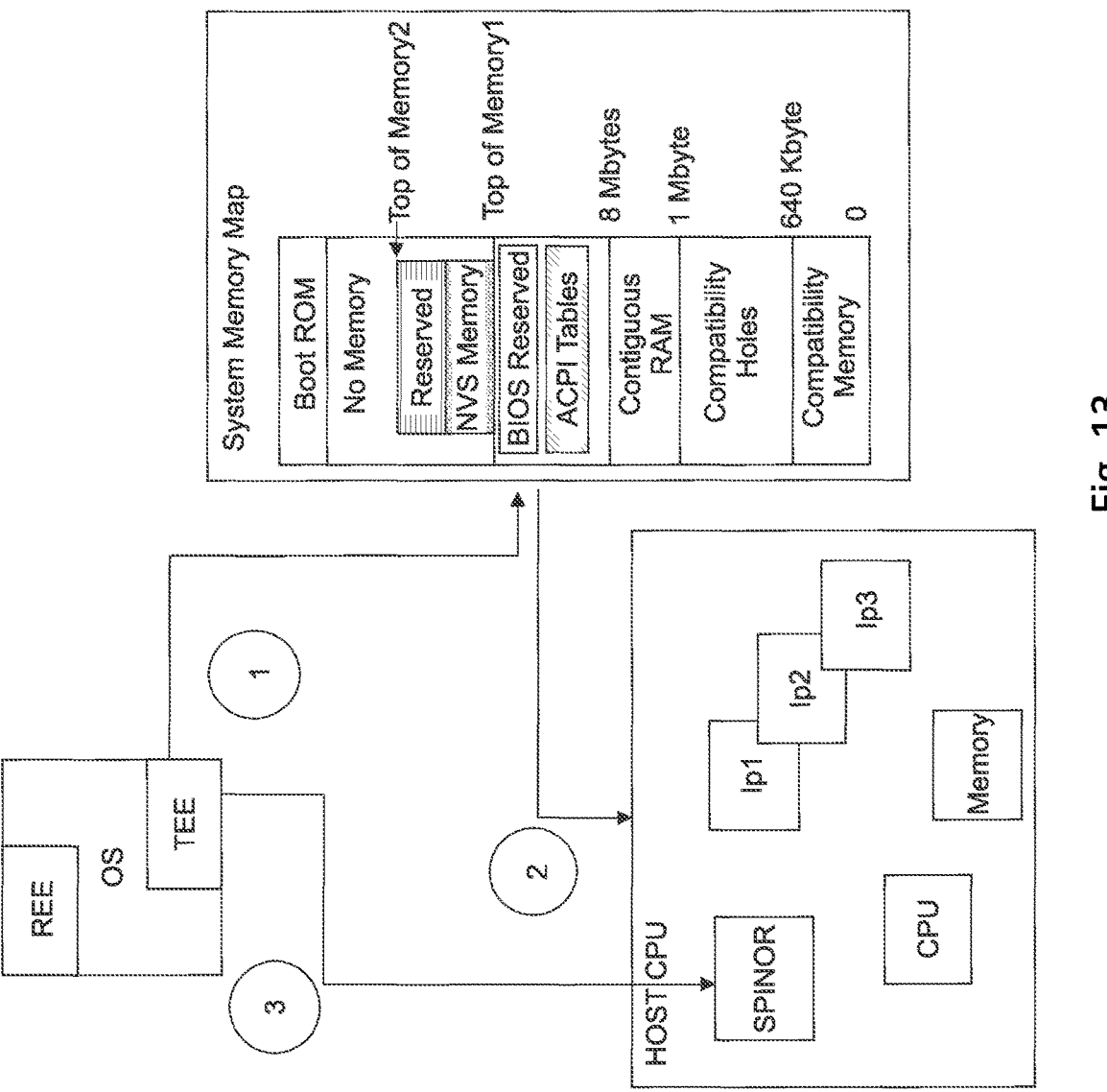
FIG. 13 illustrates an apparatus schematically.

FIG. 13 shows an apparatus. The apparatus of FIG. 13 is operable in a trusted execution environment (TEE). FIG. 13 shows a TEE based mechanism to update SPINOR based on success of "on the fly" update. Herein is disclosed a method of updating which uses a trusted execution environment (TEE) as per FIG. 13. For example, during System Firmware boot, BIOS can reserve a portion of memory (such as system memory, RAM, DRAM, and/or SRAM) to support an update of IP boot FW. The method described herein may avoid multiple writes into SPINOR. The TEE layer, which may be inside the OS, can access the reserved memory (e.g. reserved memory that may have been reserved by BIOS). The OS updater can copy the new system firmware in the reserved memory (e.g. a region of reserved memory) and/or perform a jump into this address. The address can work like a zeroth based reset vector patched into system memory, and can be responsible for CPU, chipset initialization, and/or IP FW update, e.g. without corrupting the BIOS image flashed into SPINOR. Upon successful completion of the BIOS operation, system firmware can boot to OS. After successful booting to TEE (e.g. 30 seconds after booting successfully to TEE), SPINOR driver as part of TEE can write the same system firmware (e.g. the update FW) in the SPINOR. The method disclosed herein can ensure that firmware updates are trusted and verified. Furthermore, it is possible to avoid having a dual copy of SPINOR which can reduce the bill of materials (BOM).

Figure 14:
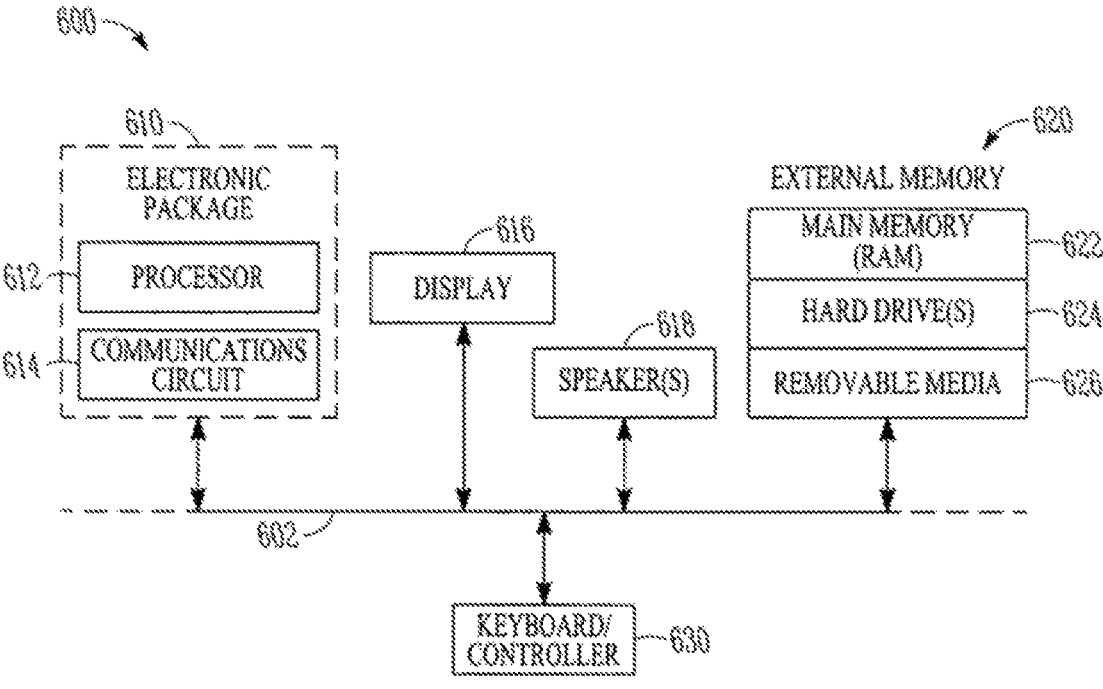
FIG. 14 illustrates a block diagram of an electronic apparatus.

FIG. 14 illustrates a block diagram of an electronic apparatus. The apparatus 600 can include any of the devices described herein such as device 150 described with respect to FIG. 1B. The apparatus 600 can be configured to perform any of the methods described herein such as that described with respect to FIG. 1A.

The apparatus 600 can include at least one electronic assembly 30 and/or method described herein. Electronic apparatus 600 is merely one example of an electronic apparatus in which forms of the devices, other apparatuses, and/or methods described herein may be used. Examples of an electronic apparatus 600 include, but are not limited to, personal computers, tablet computers, mobile telephones, game devices, MP3 or other digital music players, etc. In this example, electronic apparatus 600 comprises a data processing system that includes a system bus 602 to couple the various components of the electronic apparatus 600. System bus 602 provides communications links among the various components of the electronic apparatus 600 and may be implemented as a single bus, as a combination of busses, or in any other suitable manner.

An electronic assembly 610 as describe herein may be coupled to system bus 602. The electronic assembly 610 may include any circuit or combination of circuits. In one embodiment, the electronic assembly 610 includes a processor 612 which can be of any type. As used herein, "processor" means any type of computational circuit, such as but not limited to a microprocessor, a microcontroller, a complex instruction set computing (CISC) microprocessor, a reduced instruction set computing (RISC) microprocessor, a very long instruction word (VLIW) microprocessor, a graphics processor, a digital signal processor (DSP), multiple core processor, or any other type of processor or processing circuit.

Other types of circuits that may be included in electronic assembly 610 are a custom circuit, an application-specific integrated circuit (ASIC), or the like, such as, for example, one or more circuits (such as a communications circuit 614) for use in wireless devices like mobile telephones, tablet computers, laptop computers, two-way radios, and similar electronic systems. The IC can perform any other type of function.

The electronic apparatus 600 may also include an external memory 620, which in turn may include one or more memory elements suitable to the particular application, such as a main memory 622 in the form of random access memory (RAM), one or more hard drives 624, and/or one or more drives that handle removable media 626 such as compact disks (CD), flash memory cards, digital video disk (DVD), and the like.

The electronic apparatus 600 may also include a display device 616, one or more speakers 618, and a keyboard and/or controller 630, which can include a mouse, trackball, touch screen, voice-recognition device, or any other device that permits a system user to input information into and receive information from the electronic apparatus 600.

For example, the electronic assembly 610, possibly in combination with reserved memory which can be in the main memory 622, may be configured to execute the methods described herein, such as manage a firmware update for a device such as the electronic apparatus 600.

Herein, "IP" and "device" may be used interchangeably.

The following examples are also herein disclosed, as enumerated examples. The enumerated examples include features which may be described herein with regard to other examples, to illustrate that the features described herein above and below, with respect to different examples, are expressly combinable with every other example herein.

Enumerated Example 1

A method of handling a firmware update for a device, comprising:
  determining a device to be in an updatable state;
  setting the device into an updating state after determining the updatable state;
  after the device is in the updating state,
    writing a firmware update to memory for the device; wherein
  after writing the firmware update, the device is switchable to a working state in which the device operates based on the firmware update.

Enumerated Example 2

The method of enumerated example 1, wherein
  the device is switchable to the working state without a reboot of the device and/or a reboot of an agent which manages the updating of the device.

Enumerated Example 3

The method of any preceding enumerated example, further comprising
  setting the device to the working state.

Enumerated Example 4

The method of any preceding enumerated example, wherein
  the updatable state includes at least one of: an idle state, a low power state, a power conserving state, a paused state, a D1 state, a D2 state, a D3 state, a condition of the device after a notice that the device is ready to change states (such as enter a less powered state, and/or such as exit from a D0 state to a less powered state), or an off state.

Enumerated Example 5

The method of any preceding enumerated example, wherein
  the determining of the device to be in an updatable state includes a communication by the device to at least one of an advanced configuration and power interface (ACPI) and an operating system.

Enumerated Example 6

The method of enumerated example 5, wherein
  the communication is a notice that the device is ready to enter the updatable state or a request to enter the updatable state.

Enumerated Example 7

The method of any previous enumerated example, wherein
  a power manager determines the device to be in the updatable state.

Enumerated Example 8

The method of any preceding enumerated example, wherein
  the working state is a D0 state.

Enumerated Example 9

The method of any preceding enumerated example, further comprising
  queuing an access request to the device while in the updating state.

Enumerated Example 10

The method of any preceding enumerated example, further comprising
  queuing a plurality of access requests to the device while in the updating state.

Enumerated Example 11

The method of any preceding enumerated example, wherein
  the determining of the updatable state is based on a communication from the device of at least one of: a change of state of the device or a request of a change of state of the device.

Enumerated Example 12

The method of any preceding enumerated example, further comprising
  preserving a context of the device after determining the device to be in an updatable state.

Enumerated Example 13

The method of any preceding enumerated example, further comprising
  switching of the device into at least one of: an idle state, a low power state, a power conserving state, and an off state Enumerated Example 14

The method of any preceding claim, further comprising:
  storing a firmware update in a reserved memory;
  testing a device using the firmware update in the reserved memory; wherein
  writing the firmware update is after the testing.

Enumerated Example 15

The method of any preceding enumerated example, wherein the firmware update includes code for an operation of the device.

Enumerated Example 16

The method of Enumerated example 14 or 15, wherein
  the testing includes using a portion of a previous firmware which is copied to the reserved memory from a non-volatile memory.

Enumerated Example 17

(#3) The method of any one of enumerated example 14-16, further comprising:
  operating the device with the previous firmware in the reserved memory while the firmware update is stored in the secondary firmware bank before the testing; wherein storing the firmware update in a reserved memory includes
    storing the firmware update in a secondary firmware bank before the testing.

Enumerated Example 18

The method of any preceding enumerated example, further comprising at least one of:
  determining a state of the device before testing;
  determining a busy state which is the device operating using the previous firmware before storing the firmware update in the reserved memory; or
  determining an end of the busy state before the testing the device.

Enumerated Example 19

The method of any enumerated example, further comprising
  testing a second device.

Enumerated Example 20

The method of any preceding enumerated example, wherein
  the device is communicatively coupled to a system on a chip or is a component of a system on a chip.

Enumerated Example 21

The method of any preceding enumerated example, wherein
  the memory for the device and/or the nonvolatile memory is at least one of flash memory or SPINOR memory.

Enumerated Example 22

(#4) The method of any preceding Enumerated example, further comprising at least one of:
  initializing the device using a previous version of firmware;
  initializing other devices;
  determining a state of the device; or
  transmitting an update request to the device including a state matching query.

Enumerated Example 23

(#4) The method of Enumerated example 22, further comprising transmitting an update request to the device including a state matching query; wherein when the state matching query is positive,
    entering an update mode, including
        copying a state of the device into a system memory;
        determining if the device is ready for the update; and
        if the device is ready,
            flagging the device as being in an updating state;
                and
            executing the update of the firmware; and
        if the device is not ready,
            postponing the update; and
when the state matching query is negative,
    postponing the update.

Enumerated Example 24

The method of Enumerated example 23, wherein
the system memory is the reserved memory.

Enumerated Example 25

The method of any preceding Enumerated example, wherein
    the reserved memory is a volatile memory storage device,
        a DRAM, or an SRAM.

Enumerated Example 26

(#5). The method of any preceding Enumerated example, wherein:
    writing the firmware update includes
        writing a first part of the firmware update to a flash
            memory device and
        writing a second part of the firmware update to a boot
            partition.

Enumerated Example 27

(#5). The method of Enumerated example 26, wherein
the flash memory device is serial peripheral interface
    NOR memory.

Enumerated Example 28

(#5). The method of Enumerated example 26 or 27, wherein
    the first part is data which requires updating less often
        than the second part which is code.

Enumerated Example 29

(#6) The method of any preceding Enumerated example, wherein
    the device is configurable to switch between a plurality of
        states, including at least two of a D0 state, a D1 state,
        a D2 state,
    an operating state,
    a busy state,
    a power saving state,
    a hot state which can enter the operating state without
        reinitialization,
    an updating state which includes at least one of:
        a testing state for the testing, or
        a preserving state for providing state information for
            copying the previous state of the device to a
            memory.

Enumerated Example 30

(#7) The method of any preceding Enumerated example, wherein
    the testing includes comparing an expected service and an
        actual service between a primary and a secondary
        device.

Enumerated Example 31

(#7) The method of Enumerated example 30, further comprising
    determining an operational relation between the primary
        device and the secondary device before the testing,

Enumerated Example 32

(#7) The method of Enumerated example 31, wherein
    the operational relation includes an operational service
        between the primary and secondary devices.

Enumerated Example 33

(#8) The method of any preceding Enumerated example, wherein
    the writing is after a rebooting and/or restarting of at least
        one of the device or a SoC or a CPU.

Enumerated Example 34

(#8) The method of any preceding Enumerated example, wherein
    the writing is such that a host CPU or converged security
        engine updates the device firmware in serial peripheral
        interface NOR memory.

Enumerated Example 35

(#8) The method of any preceding Enumerated example, further comprising
    reserving a portion of system memory for the reserved
        memory during booting.

Enumerated Example 36

(#8) The method of Enumerated example 35, further comprising
    accessing the reserved memory utilizing a trusted execu-
        tion environment.

Enumerated Example 37

(#8) The method of Enumerated example 35 or 36, further comprising
    utilizing a trusted execution environment for accessing
        the reserved memory.

Enumerated Example 38

(#8) The method of any one of Enumerated example
35-37, further comprising
    jumping to the reserved memory for at least one of:
        initializing a chipset, operating a CPU, or accessing the
        firmware update.

Enumerated Example 39

(#8) The method of any one of Enumerated example
35-38, wherein the reserving is done by the basic input-
output system.

Enumerated Example 40

(#8) The method of any one of Enumerated examples 35-39, further comprising at least one of:
  booting to the operating system after operating successfully the BIOS; or
  booting to the trusted execution environment; wherein writing includes writing the firmware update in the SPI NOR.

Enumerated Example 41

A nontransitory computer readable medium including instructions for a computer program to control, manage and/or perform the method of any one of Enumerated examples 1-40.

Enumerated Example 42

An apparatus comprising circuitry configured to control, manage, and/or perform the method of any one of Enumerated examples 1-40.

Enumerated Example 43

The apparatus of Enumerated example 42, further comprising:
  a memory device including the reserved memory;
  the device; and optionally
  the nonvolatile memory.

Enumerated Example 44

The apparatus of any one of Enumerated example 42-43, further configured for
  an update agent configured to manage, control, and/or perform the updating of the firmware.

Enumerated Example 45

The apparatus of any one of Enumerated example 43-44, further comprising at least one of
  a processor for managing, controlling, and/or performing the updating or a converged security engine for managing, controlling, and/or performing the updating.

Enumerated Example 46

An apparatus configured to control and/or manage handling a firmware update according to any enumerated example 1-40.

Enumerated Example 47

An apparatus, such as that of enumerated example 46, comprising
  a circuit configured to:
    determine a device to be in an updatable state;
    set the device to an updating state after determining the updatable state; and
    after the device is in the updating state,
      trigger writing a firmware update to the memory for the device such that:
        after writing of the firmware update, the device is configured to be switchable to an operating state in which the device operates based on the firmware update.

Enumerated Example 48

The apparatus of enumerated example 47, wherein the circuit is configured to communicate with a device and a memory for the device;

Enumerated Example 49

A method of handling a firmware update, such as updating a device with a firmware update, comprising:
  storing a firmware update in a reserved memory;
  testing a device using the firmware update in the reserved memory; wherein
  writing the firmware update to nonvolatile memory for the device after the testing.

Enumerated Example 50

The method of enumerated example 49,
  wherein the firmware update includes code for an operation of the device.

Enumerated Example 51

The method of Enumerated example 49 or 50, wherein
  the testing includes using a portion of a previous firmware which is copied to the reserved memory from a nonvolatile memory.

Enumerated Example 52

(#3) The method of any one of enumerated example 49-51, further comprising:
  operating the device with the previous firmware in the reserved memory while the firmware update is stored in the secondary firmware bank before the testing; wherein
  storing the firmware update in a reserved memory includes
    storing the firmware update in a secondary firmware bank before the testing.

Enumerated Example 53

The method of any one of enumerated example 49-52, further comprising at least one of:
  determining a state of the device before testing;
  determining a busy state which is the device operating using the previous firmware before storing the firmware update in the reserved memory; or
  determining an end of the busy state before the testing the device.

Enumerated Example 54

The method of any one of enumerated example 49-53, further comprising
  testing a second device.

Enumerated Example 55

The method of any one of enumerated example 49-54, wherein
  the device is communicatively coupled to a system on a chip or is a component of a system on a chip.

Enumerated Example 56

The method of any one of enumerated example 49-55, wherein
    the memory for the device and/or the nonvolatile memory is at least one of flash memory or SPINOR memory.

Enumerated Example 57

(#4) The method of any one of enumerated example 49-56, further comprising at least one of:
    initializing the device using a previous version of firmware;
    initializing other devices;
    determining a state of the device; or
    transmitting an update request to the device including a state matching query.

Enumerated Example 58

(#4) The method of Enumerated example 57, further comprising
    transmitting an update request to the device including a state matching query; wherein
    when the state matching query is positive,
        entering an update mode, including
            copying a state of the device into a system memory;
            determining if the device is ready for the update; and
            if the device is ready,
                flagging the device as being in an updating state; and
                executing the update of the firmware; and
            if the device is not ready,
                postponing the update; and
    when the state matching query is negative,
        postponing the update.

Enumerated Example 59

The method of Enumerated example 58, wherein
the system memory is the reserved memory.

Enumerated Example 60

The method of any one of enumerated example 49-59, wherein
    the reserved memory is a volatile memory storage device, a DRAM, or an SRAM.

Enumerated Example 61

(#5). The method of any one of enumerated example 49-60,
    wherein:
    writing the firmware update includes
        writing a first part of the firmware update to a flash memory device and
        writing a second part of the firmware update to a boot partition.

Enumerated Example 62

(#5). The method of Enumerated example 61, wherein the flash memory device is serial peripheral interface NOR memory.

Enumerated Example 63

(#5). The method of Enumerated example 61 or 62, wherein
    the first part is data which requires updating less often than the second part which is code.

Enumerated Example 64

(#6) The method of any one of enumerated example 49-63, wherein
    the device is configurable to switch between a plurality of states, including at least two of a D0 state, a D1 state, a D2 state,
    an operating state,
    a busy state,
    a power saving state,
    a hot state which can enter the operating state without reinitialization,
    an updating state which includes at least one of:
        a testing state for the testing, or
        a preserving state for providing state information for copying the previous state of the device to a memory.

Enumerated Example 65

(#7) The method of any one of enumerated example 49-64, wherein
    the testing includes comparing an expected service and an actual service between a primary and a secondary device.

Enumerated Example 66

(#7) The method of Enumerated example 65, further comprising
    determining an operational relation between the primary device and the secondary device before the testing,

Enumerated Example 67

(#7) The method of Enumerated example 66, wherein
    the operational relation includes an operational service between the primary and secondary devices.

Enumerated Example 68

(#8) The method of any one of enumerated example 49-67, wherein
    the writing is after a rebooting and/or restarting of at least one of the device or a SoC or a CPU.

Enumerated Example 69

(#8) The method of any one of enumerated example 49-68, wherein
    the writing is such that a host CPU or converged security engine updates the device firmware in serial peripheral interface NOR memory.

Enumerated Example 70

(#8) The method of any one of enumerated example 49-69, further comprising
    reserving a portion of system memory for the reserved memory during booting.

Enumerated Example 71

(#8) The method of Enumerated example 70, further comprising
   accessing the reserved memory utilizing a trusted execution environment.

Enumerated Example 72

(#8) The method of Enumerated example 70 or 71, further comprising
   utilizing a trusted execution environment for accessing the reserved memory.

Enumerated Example 73

(#8) The method of any one of Enumerated example 70-72, further comprising
   jumping to the reserved memory for at least one of: initializing a chipset, operating a CPU, or accessing the firmware update.

Enumerated Example 74

(#8) The method of any one of Enumerated example 70-73, wherein
   the reserving is done by the basic input-output system.

Enumerated Example 75

(#8) The method of any one of Enumerated example 70-74, further comprising at least one of:
   booting to the operating system after operating successfully the BIOS; or
   booting to the trusted execution environment; wherein writing includes writing the firmware update in the SPI NOR.

Enumerated Example 76

A nontransitory computer readable medium including instructions for a computer program to control, manage and/or perform the method of any one of Enumerated examples 49-75.

Enumerated Example 77

An apparatus comprising circuitry configured to control, manage, and/or perform the method of any one of Enumerated examples 49-75.

Enumerated Example 78

The apparatus of Enumerated example 77, further comprising:
   a memory device including the reserved memory;
   the device; and optionally
   the nonvolatile memory.

Enumerated Example 79

The apparatus of any one of Enumerated example 77-78, further configured for
   an update agent configured to manage, control, and/or perform the updating of the firmware.

Enumerated Example 80

The apparatus of any one of Enumerated example 78-79, further comprising at least one of
   a processor for managing, controlling, and/or performing the updating or a converged security engine for managing, controlling, and/or performing the updating.

Enumerated Example 81

An apparatus configured to control and/or manage handling a firmware update according to any enumerated example 49-75.

Enumerated Example 82

An apparatus, such as that of enumerated example 81, comprising
   a circuit configured to:
      determine a device to be in an updatable state;
      set the device to an updating state after determining the updatable state; and
      after the device is in the updating state,
         trigger writing a firmware update to the memory for the device such that:
            after writing of the firmware update, the device is configured to be switchable to an operating state in which the device operates based on the firmware update.

Enumerated Example 83

The apparatus of enumerated example 82, wherein the circuit is configured to communicate with a device and a memory for the device;

Enumerated Example 84

A method of accepting or rejecting a firmware update, comprising:
   storing a firmware update in a reserved memory (such as in volatile memory such as DRAM/SRAM on device or system);
   testing the operation of a device using the firmware update in the reserved memory; and
   when the test fails,
      rejecting the firmware update, and
      rolling back to a previous version of firmware such that the device is configured to operate using the previous version of firmware; or
   when the test succeeds,
      accepting the firmware update by writing the firmware update to nonvolatile memory such that the device is configured to operate using the updated version of firmware.
Additional enumerated examples follow.

Example A-1

An apparatus for managing a firmware update of a device, configured to:
   determine a device to be in an updatable state;
   cause the device to be set to an updating state; and
   cause a firmware update code to be written in reserved memory;

cause a test of the device which includes operation of the device based on the firmware update code after the firmware update code is written in the reserved memory;

determine a result of the test; and for a pass, cause writing of the firmware update code to nonvolatile memory, and for a fail, reject or postpone the firmware update.

Example A-2

The apparatus of Example A-1, further configured to:

determine that the firmware update is available before causing the device to be set to the updating state; and maintain an operational state of the apparatus while managing the firmware update.

Example A-3

The apparatus of any one of Examples A-1 to A-2, wherein the updatable state includes at least one of: an idle state, a low power state, a power conserving state, a paused state, a D1 state, a D2 state, a D3 state, a condition of the device after a notice that the device is ready to change states, or an off state.

Example A-4

The apparatus of any one of Examples A-1 to A-3, further comprising:

a power manager which determines the device to be in the updatable state.

Example A-5

The apparatus of any one of Examples A-1 to A-4, configured to:

determine the device to be in a working state, and cause the firmware update code to be stored in a secondary firmware bank of the reserved memory after determining the device to be in the working state, and until the determination that the device is in an updatable state; and causing relocating of the firmware update code out of the secondary firmware bank to a primary firmware bank of the reserved memory before causing the test.

Example A-6

The apparatus of any one of Examples A-1 to A-5, configured to:

cause storing of a context of the device and cause halting of a service of the device, before causing a reset of the device.

Example A-7

The apparatus of Example A-6, wherein:

the reset is such that:

after the reset, the device loads the firmware update from the reserved memory and the device restores the context and the device resumes the service.

Example A-8

The apparatus of any one of Examples A-1 to A-7, configured to:

cause a second test of a second device which is communicatively coupled to the device, and determine a result of the second test, and for a pass of the second test, cause the writing of the firmware update code to the nonvolatile memory, and for a fail of the second test, reject the firmware update.

Example A-9

The apparatus of any one of Examples A-1 to A-8, configured to:

compare an expected service and an actual service of the second device when determining the result of the second test.

Example A-10

The apparatus of any one of Examples A-1 to A-9, configured to:

transmit an update request to the device before causing the device to be set to an updatable state, wherein the update request includes a state matching query; wherein when the state matching query is positive, the apparatus causes copying of a context of the device into a system memory, and the device to be set to the updating state; and wherein the apparatus is configured to subsequently:

determine if the device is ready for the update; and if the device is ready, cause the device to be set to the updating state; and if the device is not ready, postpone the update; and when the state matching query is negative, postpone the update.

Example A-11

The apparatus of any one of Examples A-1 to A-10, configured such that when the update is postponed, the apparatus is configured to cause the firmware update code to be stored in a secondary firmware bank.

Example A-12

An apparatus configured to manage handling a firmware update for a device, configured to:

determine a device to be in an updatable state;

cause the device to be set into an updating state after determining the updatable state;

after the device is in the updating state, causing a firmware update to be written to a memory for the device; wherein after writing the firmware update, the device is switchable to a working state in which the device operates based on the firmware update.

Example A-13

The apparatus of Example A-12, wherein
the device is switchable to the working state without a
  reboot of the apparatus.

Example A-14

The apparatus of any one of Examples A-12 to A-13,
further comprising:
  an advanced configuration and power interface configured
    for determination of the updatable state of the device.

Example A-15

The apparatus of any one of Examples A-12 to A-14,
further configured to:
  queue an access request to the device while the device is
    in the updating state.

Example A-16

The apparatus of any one of Examples A-12 to A-15,
further configured to:
  cause, before the determination of the device to be in the
    updatable state, the device to switch into at least one of:
    an idle state, a low power state, a power conserving
    state, or an off state.

Example A-17

The apparatus of any one of Examples A-12 to A-16,
further configured to:
  transmit an update request to the device including a state
    matching query.

Example A-18

The apparatus of Example A-17, further configured to:
cause the device to enter the updating state when the state
  matching query is positive,
and postpone the update when the state matching query is
  negative; wherein
when the device is in the updating state, the apparatus is
  configured to:
  cause copying of a context of the device into a system
    memory;
  determine if the device is ready for the update; and
    if the device is ready,
      cause the device to be flagged as being in an
        updating state; and
    if the device is not ready,
      postponing the update.

Example A-19

The apparatus of any one of Examples A-12 to A-18,
further configured to:
  cause the writing of a first part of the firmware update to
    a serial peripheral interface NOR memory and cause
    the writing of a second part of the firmware update to
    a boot partition; wherein at least one of:
    the first part is data and the second part is code, or
    the first part is configured for more infrequent updating
      than the second part.

Example A-20

A method of managing a firmware update for a device,
comprising:
  maintaining an operational state of a managing apparatus
    during the management of the firmware update;
  determining a device to be in an updatable state;
  setting the device to an updating state; and
  storing a firmware update code in reserved memory;
  testing the device based on the firmware update code in
    the reserved memory;
  determining a result of the test; and
    for a pass, writing the firmware update code to non-
      volatile memory, and
    for a fail, rejecting the firmware update.

Example A-21

The method of any Example A-20, further comprising:
  determining the device to be in a working state before
    determining the device to be in the updatable state,
  storing the firmware update code in a secondary firmware
    bank of the reserved memory before determining the
    device to be in an updatable state; and
  relocating the firmware update code out of the secondary
    firmware bank to a primary firmware bank of the
    reserved memory before the testing.

Example A-22

The method of any one of Examples A-20 or A-21, further
comprising:
  halting operation of the device,
  saving a context of the device,
  resetting the device, and
  loading the firmware update code from a primary firm-
    ware bank of the reserved memory,
  restoring the context of the device, and
  resuming the operation of the device.

Example A-23

The method of any one of Examples A-20 to A-22,
wherein
  the reserved memory is a volatile memory storage device,
    a dynamic RAM, and/or a static RAM.

Example A-24

A nontransitory computer readable medium comprising
instructions that, when executed by at least one processor,
cause an apparatus to manage a firmware update for a
device, comprising:
  maintaining an operational state of a managing apparatus
    during the management of the firmware update;
  determining a device to be in an updatable state;
  setting the device to an updating state; and
  storing a firmware update code in reserved memory;
  testing the device based on the firmware update code in
    the reserved memory;
  determining a result of the test; and
    for a pass, writing the firmware update code to non-
      volatile memory, and
    for a fail, rejecting the firmware update.
  The aspects and features described in relation to a par-
ticular one of the previous examples may also be combined
with one or more of the further examples to replace an identical or similar feature of that further example or to additionally introduce the features into the further example.

Examples may further be or relate to a (computer) program including a program code to execute one or more of the above methods when the program is executed on a computer, processor or other programmable hardware component. Thus, steps, operations or processes of different ones of the methods described above may also be executed by programmed computers, processors or other programmable hardware components. Examples may also cover program storage devices, such as digital data storage media, which are machine-, processor- or computer-readable and encode and/or contain machine-executable, processor-executable or computer-executable programs and instructions. Program storage devices may include or be digital storage devices, magnetic storage media such as magnetic disks and magnetic tapes, hard disk drives, or optically readable digital data storage media, for example. Other examples may also include computers, processors, control units, (field) programmable logic arrays ((F)PLAs), (field) programmable gate arrays ((F)PGAs), graphics processor units (GPU), application-specific integrated circuits (ASICs), integrated circuits (ICs) or system-on-a-chip (SoCs) systems programmed to execute the steps of the methods described above.

It is further understood that the disclosure of several steps, processes, operations or functions disclosed in the description or claims shall not be construed to imply that these operations are necessarily dependent on the order described, unless explicitly stated in the individual case or necessary for technical reasons. Therefore, the previous description does not limit the execution of several steps or functions to a certain order. Furthermore, in further examples, a single step, function, process or operation may include and/or be broken up into several sub-steps, -functions, -processes or -operations.

If some aspects have been described in relation to a device or system, these aspects should also be understood as a description of the corresponding method. For example, a block, device or functional aspect of the device or system may correspond to a feature, such as a method step, of the corresponding method. Accordingly, aspects described in relation to a method shall also be understood as a description of a corresponding block, a corresponding element, a property or a functional feature of a corresponding device or a corresponding system.

The following claims are hereby incorporated in the detailed description, wherein each claim may stand on its own as a separate example. It should also be noted that although in the claims a dependent claim refers to a particular combination with one or more other claims, other examples may also include a combination of the dependent claim with the subject matter of any other dependent or independent claim. Such combinations are hereby explicitly proposed, unless it is stated in the individual case that a particular combination is not intended. Furthermore, features of a claim should also be included for any other independent claim, even if that claim is not directly defined as dependent on that other independent claim.

What is claimed is:

1. A method of managing a firmware update for a device, comprising:
   maintaining an operational state of a managing apparatus during the management of the firmware update;
   determining a device to be in an updatable state;
   setting the device to an updating state; and
   storing a firmware update code in reserved memory;
   performing a functional testing, wherein the test includes:
   operation of the device based on the firmware update code in the reserved memory, and
   comparison of a run-time behavior of the device against reference information indicative of correct operation;
   determining a result of the test; and
   for a pass, writing the firmware update code to nonvolatile memory, and
   for a fail, rejecting or postponing the firmware update.

2. The method of claim 1, further comprising:
   determining the device to be in a working state before determining the device to be in the updatable state,
   storing the firmware update code in a secondary firmware bank of the reserved memory before determining the device to be in an updatable state; and
   relocating the firmware update code out of the secondary firmware bank to a primary firmware bank of the reserved memory before the testing.

3. The method of claim 1, further comprising:
   halting operation of the device,
   saving a context of the device,
   resetting the device, and
   loading the firmware update code from a primary firmware bank of the reserved memory,
   restoring the context of the device, and
   resuming the operation of the device.

4. The method of claim 1, wherein
   the reserved memory is a volatile memory storage device, a dynamic RAM, and/or a static RAM.

5. An apparatus for managing a firmware update of a device, the apparatus comprising a processing unit and configured to:
   determine a device to be in an updatable state;
   cause the device to be set to an updating state; and
   cause a firmware update code to be written in reserved memory;
   cause a functional test of the device, wherein the test includes:
   operation of the device based on the firmware update code after the firmware
   update code is written in the reserved memory, and
   comparison of a run-time behavior of the device against reference information indicative of correct operation;
   determine a result of the test; and
   for a pass, cause writing of the firmware update code to nonvolatile memory, and
   for a fail, reject or postpone the firmware update.

6. The apparatus of claim 5, further configured to:
   determine that the firmware update is available before causing the device to be set to the updating state; and
   maintain an operational state of the apparatus while managing the firmware update.

7. The apparatus of claim 5, wherein
   the updatable state includes at least one of: an idle state, a low power state, a power conserving state, a paused state, a D1 state, a D2 state, a D3 state, a condition of the device after a notice that the device is ready to change states, or an off state.

8. The apparatus of claim 5, further comprising:

a power manager which determines the device to be in the updatable state.

9. The apparatus of claim 5, configured to:

determine the device to be in a working state, and cause the firmware update code to be stored in a secondary firmware bank of the reserved memory after determining the device to be in the working state, and until the determination that the device is in an updatable state; and causing relocating of the firmware update code out of the secondary firmware bank to a primary firmware bank of the reserved memory before causing the test.

10. The apparatus of claim 5, configured to:

cause storing of a context of the device and cause halting of a service of the device, before causing a reset of the device.

11. The apparatus of claim 10, wherein:

the reset is such that:

after the reset, the device loads the firmware update from the reserved memory and the device restores the context and the device resumes the service.

12. The apparatus of claim 5, configured to:

cause a second test of a second device which is communicatively coupled to the device, and determine a result of the second test, and for a pass of the second test, cause the writing of the firmware update code to the nonvolatile memory, and for a fail of the second test, reject or postpone the firmware update.

13. The apparatus of claim 12, configured to:

compare an expected service and an actual service of the second device when determining the result of the second test.

14. The apparatus of claim 5, configured to:

transmit an update request to the device before causing the device to be set to an updatable state, wherein the update request includes a state matching query; wherein when the state matching query is positive, the apparatus causes copying of a context of the device into a system memory, and the device to be set to the updating state; and wherein the apparatus is configured to subsequently:

determine if the device is ready for the update; and if the device is ready, cause the device to be set to the updating state; and if the device is not ready, postpone the update; and when the state matching query is negative, postpone the update.

15. The apparatus of claim 14, configured such that when the update is postponed, the apparatus is configured to cause the firmware update code to be stored in a secondary firmware bank.

16. An apparatus configured to manage handling a firmware update for a device, the apparatus comprising a processing unit and configured to:

determine a device to be in an updatable state;

cause the device to be set into an updating state after determining the updatable state;

after the device is in the updating state, storing a firmware update code in a reserved memory, performing a functional test of the of the device, wherein the test includes:

operation of the device based on the firmware update code in the reserved memory, and comparison of a run-time behavior of the device against reference information indicative of correct operation;

causing a firmware update to be written to a non-volatile memory for the device based on a passing result of the functional test; wherein after writing the firmware update, the device is switchable to a working state in which the device operates based on the firmware update.

17. The apparatus of claim 16, wherein the device is switchable to the working state without a reboot of the apparatus.

18. The apparatus of claim 16, further comprising:

an advanced configuration and power interface configured for determination of the updatable state of the device.

19. The apparatus of claim 16, further configured to:

queue an access request to the device while the device is in the updating state.

20. The apparatus of claim 16, further configured to:

cause, before the determination of the device to be in the updatable state, the device to switch into at least one of: an idle state, a low power state, a power conserving state, or an off state.

21. The apparatus of claim 16, further configured to:

transmit an update request to the device including a state matching query.

22. The apparatus of claim 21, further configured to:

cause the device to enter the updating state when the state matching query is positive, and postpone the update when the state matching query is negative; wherein when the device is in the updating state, the apparatus is configured to:

cause copying of a context of the device into a system memory;

determine if the device is ready for the update; and if the device is ready, cause the device to be flagged as being in an updating state; and if the device is not ready, postponing the update.

23. The apparatus of claim 16, further configured to:

cause the writing of a first part of the firmware update to a serial peripheral interface NOR memory and cause the writing of a second part of the firmware update to a boot partition; wherein at least one of:

the first part is data and the second part is code, or the first part is configured for more infrequent updating than the second part.

24. A non-transitory, computer-readable medium comprising instructions that, when executed by at least one processor, cause an apparatus to manage a firmware update for a device, comprising:

maintaining an operational state of a managing apparatus during the management of the firmware update;

determining a device to be in an updatable state;

setting the device to an updating state; and storing a firmware update code in reserved memory;

performing a functional testing, wherein the test includes:

operation of the device based on the firmware update code in the reserved memory, and comparison of a run-time behavior of the device against reference information indicative of correct operation;

determining a result of the test; and for a pass, writing the firmware update code to non-volatile memory, and for a fail, rejecting or postponing the firmware update.

\* \* \* \* \*